(12) United States Patent
Rust et al.

(10) Patent No.: US 8,120,769 B2
(45) Date of Patent: Feb. 21, 2012

(54) METHOD AND SYSTEM FOR FIBER PROPERTIES MEASUREMENT

(75) Inventors: Jon P. Rust, Cary, NC (US); Michael J. Tompkins, Cherryville, NC (US)

(73) Assignee: North Carolina State University, Raleigh, NC (US)

( * ) Notice: Subject to any disclaimer, the term of this patent is extended or adjusted under 35 U.S.C. 154(b) by 755 days.

(21) Appl. No.: 11/890,300

(22) Filed: Aug. 3, 2007

(65) Prior Publication Data
US 2009/0037139 A1 Feb. 5, 2009

(51) Int. Cl.
*G01N 21/01* (2006.01)
(52) U.S. Cl. .................. 356/245; 356/238.1; 356/242.1; 356/244; 382/141
(58) Field of Classification Search .................... 356/245
See application file for complete search history.

(56) References Cited

U.S. PATENT DOCUMENTS

| | | | |
|---|---|---|---|
| 1,980,883 A | 11/1934 | Sever | |
| 2,404,708 A | 7/1946 | Hertel | |
| 2,648,251 A | 8/1953 | Puster | |
| 2,824,486 A | 2/1958 | Lawrance et al. | |
| 3,057,019 A | 10/1962 | Hertel | |
| 3,069,964 A | 12/1962 | Simon | |
| 3,967,118 A | 6/1976 | Sternberg | |
| 4,040,243 A | 8/1977 | Weller | |
| 4,088,016 A | 5/1978 | Watson et al. | |
| 4,088,411 A | 5/1978 | Ahlquist et al. | |
| 4,205,973 A | 6/1980 | Ryan | |
| 4,266,874 A * | 5/1981 | Janin et al. | 356/335 |
| 4,512,060 A | 4/1985 | Shofner | |
| 4,827,781 A | 5/1989 | Völlm | |
| 5,270,787 A | 12/1993 | Shofner et al. | |
| 5,293,219 A * | 3/1994 | Ayer | 356/634 |
| 5,311,290 A * | 5/1994 | Olson et al. | 356/634 |

(Continued)

FOREIGN PATENT DOCUMENTS

DE 32 30 523 A1 3/1983

(Continued)

OTHER PUBLICATIONS

"3021/3023 BuckPuck Wide Range LED Power Module," Operations Manual, LUXDRIVE, a Division of LEDdynamics, Inc., Randolph, VT, 2005.

(Continued)

*Primary Examiner* — Sath V Perungavoor
(74) *Attorney, Agent, or Firm* — Jenkins, Wilson, Taylor & Hunt P.A.

(57) ABSTRACT

A fiber measurement system for precision measurement of individual fiber properties, including length and fiber length distribution is provided. The fiber measurement system includes a fiber introduction system configured to introduce a plurality of individualized fibers. A fiber guidance enclosure is configured to receive the fibers from the fiber introduction system. The fiber guidance enclosure has an enclosed pathway and a viewing area. The viewing area has a height that limits mobility of the fibers in a Z-direction and the viewing area has a width that is wider than the enclosed pathway. A sensing system is provided for detecting the presence of the fibers within the fiber guidance enclosure. An imaging system is positioned proximal the viewing area of the fiber guidance enclosure to capture an image of the individualized fiber as the fibers pass through the viewing area. A controller is provided for analyzing the image data to determine at least one property of the fibers.

21 Claims, 17 Drawing Sheets

U.S. PATENT DOCUMENTS

| | | | |
|---|---|---|---|
| 5,469,253 A | 11/1995 | Shofner et al. | |
| 5,486,915 A * | 1/1996 | Jeffers et al. | 356/318 |
| 5,500,735 A | 3/1996 | Bentley et al. | 356/364 |
| 5,533,145 A | 7/1996 | Shofner et al. | |
| 5,594,544 A * | 1/1997 | Horiuchi et al. | 356/73 |
| 5,611,238 A | 3/1997 | Bader et al. | |
| 5,786,894 A | 7/1998 | Shields et al. | |
| 5,815,264 A | 9/1998 | Reed et al. | |
| 5,819,373 A * | 10/1998 | Schlichter et al. | 19/205 |
| 5,974,629 A | 11/1999 | Leifeld et al. | |
| 6,052,182 A * | 4/2000 | Irick et al. | 356/238.1 |
| 6,311,550 B1 * | 11/2001 | Lehmikangas et al. | 73/61.71 |
| 6,404,506 B1 | 6/2002 | Cheng et al. | |
| 6,476,922 B2 | 11/2002 | Paganelli | |
| 6,512,583 B1 * | 1/2003 | Ence | 356/338 |
| 6,611,994 B2 | 9/2003 | Bischofberger et al. | |
| 6,767,127 B2 | 7/2004 | Paganelli | |
| 6,882,423 B2 * | 4/2005 | Rust et al. | 356/429 |
| 6,882,740 B1 | 4/2005 | McDonald, Jr. et al. | |
| 7,057,197 B2 | 6/2006 | Stusak | |
| 7,508,509 B2 * | 3/2009 | Lehtikoski et al. | 356/338 |
| 7,551,284 B2 * | 6/2009 | Berger | 356/430 |
| 7,729,517 B2 * | 6/2010 | Naylor et al. | 382/111 |
| 2002/0180963 A1 * | 12/2002 | Chien et al. | 356/246 |
| 2004/0141188 A1 * | 7/2004 | Rust et al. | 356/634 |
| 2009/0037139 A1 * | 2/2009 | Rust et al. | 702/158 |

FOREIGN PATENT DOCUMENTS

| | | |
|---|---|---|
| DE | 41 24174 C1 | 9/1992 |
| EP | 0 764 477 A1 | 3/1997 |
| WO | WO 9114169 | 9/1991 |
| WO | WO9915877 | 4/1999 |

OTHER PUBLICATIONS

Abbott, G.M., "Open-End Spun Corona-Treated Cotton," Textile Research Journal, Sep. 1983; vol. 53: No. 9, pp. 566-567.

Abbott, G.M. & Robinson, G.A., "The Corona Treatment of Cotton Part 2: Yarn and Fabric Properties," Textile Research Journal, vol. 47; pp. 199-202, 1977.

Abbott, G.M. & Robinson, G.A., "The Corona Treatment of Cotton Part I: Silver Cohesion," Textile Research Journal, vol. 47; pp. 141-144, 1977.

"API Overview—4.1.1" Technical Note, PixeLINK, Ottawa, ON, 2004.

Blanc, N., "CCD vs CMOS—Has CCD Imaging Come to an End?,"Photogrammetric Week '01', Wichman Verlag, Heidleberg, 2001.

Byrd, T.A., "Analysis of an Image Based Fiber Length Measurement Device," Master's Thesis, North Carolina State University, 2003.

Chen, S.B. & Koch, D.L., "Electrophoresis and Sedimentation of Charged Fibers," Journal of Colloid and Interface Science 180, pp. 466-477, Article No. 0327, 1996.

Dvoracek, R., "Xenon Strobe Circuit Diagram," http://users.silenceisdefeat.net/~lgtngstk/Sites/Strobe/Strobe.html, 2005.

Gonsalves, V.E. & Van Dongeren, B.J., "Some Fundamental Questions Concerning the Static Electrification of Textile Yarns: Part II" Textile Research Journal, vol. 24, pp. 1-12, 1954.

Gower, J., *Optical Communications Systems*, 2 ed., Prentice-Hall, Hempstead, U.K., 1984.

Hemstreet, J.M. & Baril, A., "Charge-Distribution on a Fiber," Journal of Electrostatics, vol. 17, pp. 279-285, 1985.

Henry, Z.A. & Bowen, H.D., "Electrical Charge Characteristics of Single Cotton Fibers," Transactions of the ASAE, vol. 18, No. 4, pp. 722-727, 1975.

Hersh, S.P. & Montgomery, D.J., "Electrical Resistance Measurements on Fibers and Fiber Assemblies", Textile Research Journal, vol. 22, pp. 805-818, 1952.

Huang, Y. & Xu, B., "Image Analysis for Cotton Fibers Part I: Longitudinal Measurements, " Journal of the Textile Institute, vol. 72; Issue 8, pp. 713-720, Aug. 2002.

Ikiz, Y., "Fiber Length Measurement By Imaging Processing," PhD Dissertation, North Carolina State University, 2000.

Kirkwood, C.E., Bellamy, O.H., Kendrick, N.S., & Brown, H.M., "Measurement of Triboelectric Response of Raw Cottons," Textile Research Journal, vol. 24, pp. 853-860, 1954.

Litwiller, D., "CCD vs CMOS: Facts and Fiction," Photonics Spectra, Jan. 2001, Laurin Pub. Co. Inc.

"Luxeon Benefits Over Competitive LED Products," Application Brief AB15, Philips Lumileds Lighting Company, San Jose, CA, 2003.

"OPT101 Monolithic Photodiode and Single-Supply Transimpedance Amplifier Manual," Burr-Brown Products, Texas Instruments, Dallas, TX, 2003.

Parnell, C.B., Garner, T.H., & Garner, W.E., "Electrostatic Force on Cotton Fibers as Influenced by Absolute Humidity, Dry-Bulb Temperature, Fiber Length and Electric Field Intensity," Transactions of the ASAE, vol. 2, pp. 365-372, 1971.

Patil, S., Kulkarni, A.V., & Dharmadhikari, C.V., "Study of the Electrostatic Force Between a Conducting Tip in Proximity with a Metallic Surface: Theory and experiment," Journal of Applied Physics, vol. 88; No. 11, pp. 6940-6942, Dec. 1, 2000.

"PL-A780 Firewire 6.6 Megapixel Camera System Guide," PixLINK, Ottawa, ON, Jun. 2004

"Signatech Controller Manual," Advanced Illumination, Rochester, VT, 2003.

Smith, R.J. & Dorf, R.D., *Circuits Devices and Systems Fifth Edition*, John Riley and Sons Inc., New York, NY, 1992.

Stroupe, S.P., "Method for Preparation and Delivery of Cotton Fibers for Digital Imaging", Master's Thesis, North Carolina State University, 2002.

Tsao, H.K., "Electrostatic Interactions of a String-Like Particle with a Charged Plate, " Journal of Colloid and Interface Science, vol. 202, pp. 527-540, Article No. CS985471, Jun. 15, 1998.

"Xenon Flash Lamps," Hamamatsu, Iwata City, Japan, 2005, http://sales.hamamatsu.com/en/products/electron-tube-division/lightsources/xenon-flash-lamps.php&src=hp.

Xu, B. & Huang, Y., "Image Analysis for Cotton Fibers Part II: Cross-sectional Measurements," Journal of the Textile Institute, vol. 74, No. 5, pp. 409-416, May 2004.

Xu, B. & Ting, Y.L., (1996): "Fiber-image Analysis Part I: Fiber-image Enhancement," Journal of the Textile Institute, 87:2, 274-283.

Xu, B. & Ting, Y.L. (1996): "Fiber-image Analysis Part II: Measurement of General Geometric Properties of Fibers," Journal of the Textile Institute, 87:2, 284-295.

Xu, B., Wang, S., & Su, J., "Fiber image analysis. Part III: A new segmentation algorithm for autonomous separation of fiber cross-sections," Journal of the Textile Institute 90 (3): 288-297 Part I 1999.

Datasheets for PixeLINK PL-A700 Series Cameras, 2003-2005.

"FX-4400 High Output Xenon Flash Lamp" Datasheet, PerkinElmer Inc., DS 307 Rev A 0202, www.perkinelmer.com/opto, 2003.

"110 Series FX-1160 High Output Short Arc Xenon Flash Lamp with Internal Reflector" Datasheet, PerkinElmer Inc., DS 225 Rev A 0901, www.perkinelmer.com/opto, 2001.

Tompkins, Michael John, "Automated Method for Fiber Length Measurement," Master's Thesis, North Carolina State University, 2006, Aug. 4, 2006.

Jacobsen, D. & Katzman, P., "Benefits of Xenon Technology for Machine VisionIllumination," Perkin Elmer Optoelectronics, Santa Clara, CA (2001).

* cited by examiner

Thresholded Image

Filled Image

Cleaned Image

Post Thinning Image

Thinned Fiber

Cleaned Image After Nub Removal

Find Length

Find Length Close Up

Database Design

Menu

Run Sample

View Result

View History

Camera Settings

Calibrate Camera

Calibrate Resolution

METHOD AND SYSTEM FOR FIBER PROPERTIES MEASUREMENT

TECHNICAL FIELD

The subject matter described herein relates generally to systems for fiber length measurements. More particularly, the subject matter disclosed herein relates to systems and methods that use image based fiber length measurement.

BACKGROUND

The price of cotton is dictated by quality and the most significant factor contributing to the fiber quality is the length distribution of the fibers contained within the population. Therefore, it is of importance to accurately and repeatably measure the length of fibers within a population so that it is graded properly. For this reason, testing of fiber samples, such as, but not limited to, cotton, is important for determining the market value of a particular batch of material, as well as for determining a suitable usage and the processing required in gins or spinning mills. Today, nearly 100% of the cotton grown in the United States is classed employing testing instruments. Testing includes determining such characteristics as fiber length, as well as the content of undesired textile entities such as trash and neps.

In most current fiber measuring systems, the characteristics of groups or bundles of fibers are measured. From these measurements, individual fiber attributes are inferred. Thus, a true and accurate representation of individual fiber characteristics is hard to develop from such measurements. 20 million bales of cotton are produced in the United States each year with each bale being tested for a number of properties including fiber length parameters. The systems currently used to measure fiber length parameters are believed to have significant error associated with the bundle testing method mentioned above. For example, High Volume Instrumentation (HVI) measures fibers in bulk while the Advanced Fiber Information System (AFIS) measures fibers individually. However, in both cases, the length is measured indirectly. Measuring the length indirectly introduces significant amounts of error into the measurement.

Thus, a need still exists for a highly precise system to individualize and analyze measuring individual fiber properties including length of fibers.

SUMMARY

In accordance with this disclosure, the subject matter provides a novel method and system to determine fiber properties including the lengths of individual fibers. Fibers are individualized and straightened and images of the fibers are collected. Analysis of the fiber images provides individual fiber properties including length measurement data which includes total fiber length distribution. It is therefore an object of the present disclosure to provide a method and system to determine individual fiber properties including length distribution that provides accurate and reliable length measurement data. This and other objects as may become apparent from the present disclosure are achieved, at least in whole or in part, by the subject matter described herein.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which.

DETAILED DESCRIPTION

Reference will now be made in detail to the description of the present subject matter, one or more examples of which are shown in the figures. Each example is provided to explain the subject matter and not as a limitation. In fact, features illustrated or described as part of one embodiment can be used in another embodiment to yield still a further embodiment. It is intended that the present subject matter cover such modifications and variations.

Figure 1:
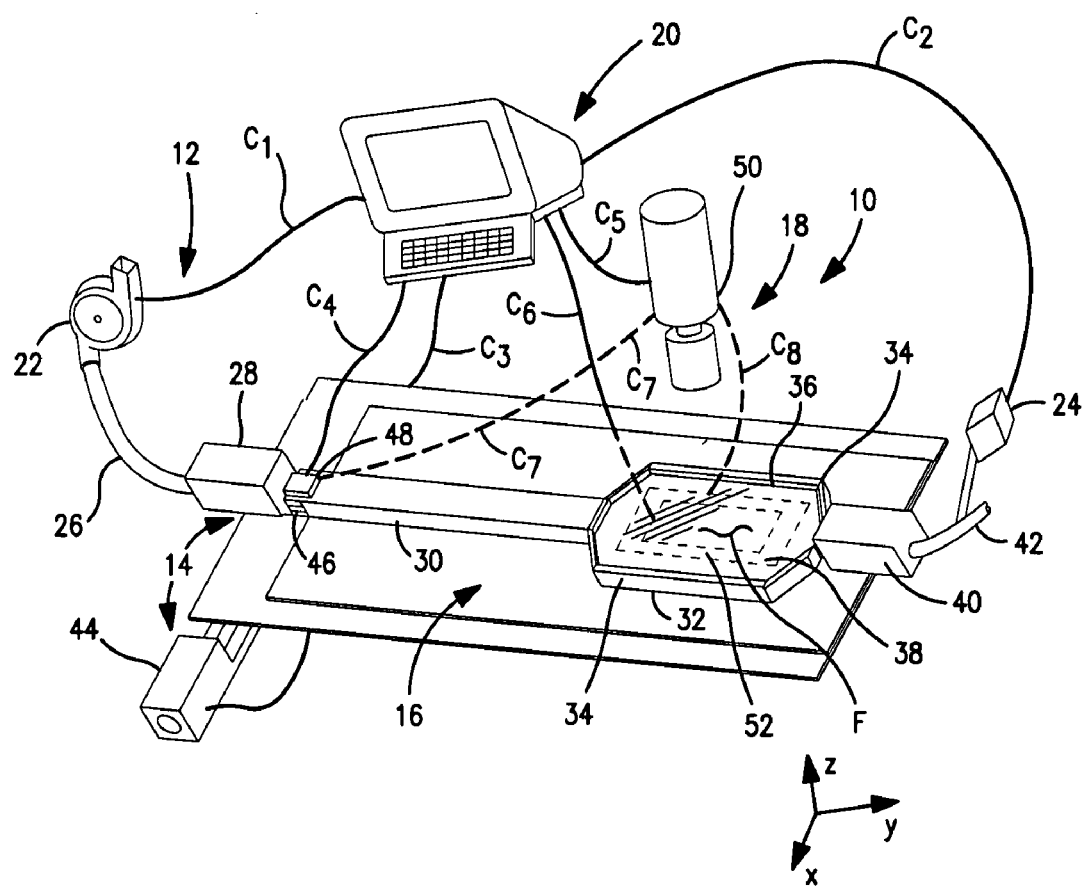
FIG. 1 illustrates a perspective view of an embodiment of a fiber measurement system according to the present subject matter.

FIG. 1 illustrates components of a fiber measurement system, generally designated as 10. Fiber measurement system 10 utilizes an air stream to deliver fibers to a position where the shape and length of the fibers may be recorded by an imaging system in order to ascertain the length of a sample of fibers with the purpose of inferring population fiber length distribution. The fiber measurement system 10 includes a fiber introduction system, generally designated as 12, a fiber sensing system, generally designated as 14, a fiber guidance enclosure, generally designated as 16, an imaging system, generally designated as 18, and a controller, generally designate as 20.

The fiber introduction system 12 is used to individualize the fibers to be measured and transport the fiber into the fiber guidance enclosure 16. Fiber introduction system 12 can include an opening device 22, such as an opening or combing roller, to individualize the fibers. The fibers can be individualized from a bundle of fibers or from an intermediate structure such as sliver. The opening roller 22 is covered with teeth which individually pluck fibers from the bundle or sliver. The fiber introduction system can also include an airflow source 24. The airflow source 24 can be air supply and/or a vacuum (as shown in FIG. 1) that creates an air stream to transport the individualized fibers through the fiber guidance enclosure. Preferably, a vacuum is used to create the airflow. Fiber introduction system can include an air duct 26 then transports the fibers to the fiber guidance enclosure 16.

Fiber guidance enclosure 16 can include an inlet 28 and an enclosed pathway 30 into which the air duct 26 transports the individualized fibers. Inlet 28 passes the fibers into enclosed pathway 30 that controls the movement of the air and fiber in the X-, Y-, and Z-directions. Enclosed pathway 30 leads the air and individualized fibers into a viewing area 32. Viewing area 32 can have a significantly greater width than the width of enclosed pathway 30. For example, viewing area 32 has a width ranging between about 2 to about 16 times the width of the enclosed pathway 30. Viewing area 32 includes two side walls 34 which widen the viewing area 32 to a wider width than enclosed pathway 30. Viewing area 32 can also include a transparent top portion 36 and a transparent window 38 (shown in dashed lines) in a bottom portion to facilitate the capturing of the image by the imaging system 18. Viewing area 32 maintains a thin cross-section in Z-direction in order to guarantee little Z-direction mobility. This allows for all portions of the fibers to be in focus for the imaging system 18 and prevents significant error in length measurement due to the making of a two-dimensional projection from a three-dimensional fiber shape. On the opposite side of the viewing area, the fiber guidance enclosure can include an outlet 40 and an outlet duct 42.

The fiber sensing system 14 is used to identify the presence of an individualized fiber in the enclosed pathway 30 to trigger the imaging system 18 at the right moment to capture the image of the identify fiber to take the measurement of its length. Fiber sensing system 14 can include a fiber illumination source, such as laser 44, which is shown through a window 46 in enclosed pathway 30 and a light sensitive sensor 48, such as a photodiode. Fiber illumination source can be other detectable light sources, such as an LED. The sensor 48 can be positioned transverse to the path of the laser 44. When a fiber crosses the path of the collimated light of laser 44, light is reflected in all directions including in the direction of sensor 48. Sensor 48 detects the reflected light from the illumination and a response is generated to trigger imaging system 18 after a delay period has allowed the fiber to pass into viewing area 32. Other detector and illumination devices and methods can be used.

Imaging system 18 can include a camera 50, or other image capturing device, and an imaging light source 52. Imaging light source 52 can be positioned about perpendicular to the width of the viewing area 32 on one side of the view area 32 and a camera 50 can be positioned about perpendicular to the width of the viewing area 32 on an opposite side of the view area. For example, camera 50 can be positioned above the transparent top portion 36 of viewing area 32 and imaging light source 52 can be placed below the transparent window 38. The positioning of imaging light source 52 below viewing area 32 creates a backlighting of the fiber F that has entered viewing area 32. Backlighting is used to create a shadow of fiber F in viewing area 32 which camera 50 captures, thereby creating an image that can be analyzed to determine the total length of fiber F. Repeating the process with hundreds or thousands of fibers provides a very precise and accurate length distribution from which a number of length parameters may be derived including short fiber content, mean length, and two percent span length. In some embodiments, the placing of the camera 50 and imaging light source 52 can be positioned other than about perpendicular to the width of the viewing area.

Controller 20 can be, for example, a computer, minicomputer, or programmable logic controller or the like. Controller 20 can be on communication with the fiber introduction system 12, sensing system 14, and imaging system 18. Such communications can be conducted through wires or wirelessly. For example, controller 20 can be in communication with the opening roller 22 through line $C_1$ and air source 24 through communication line $C_2$ to control the fiber feed in system 10. Controller 20 can be in communication with sensing system 14 through communication line $C_4$ that connects controller 20 to sensor 48. Controller 20 can also be in communication with laser 44 through communication line $C_3$ as an option. Further, controller 20 can be in communication with imaging system 18 through communication line $C_5$ that connects controller 20 to camera 50 and by communication line $C_6$ that connects controller 20 to imaging light source 52.

Alternatively, camera 50 can be in direct communications with sensor 48 along communication line $C_7$ (shown in dashed lines). For example, camera 50 can be hardware triggered directly between camera 50 and sensor 48. Similarly, camera 50 can be in direct communications with imaging light source 52 along communication line $C_8$ (also shown in dashed lines), so that camera 50 can control the flashing of imaging light source 52 to capture the image of the passing fiber at the appropriate moment. Direct linkages between camera 50 and imaging light source 52 and sensor 48 can also be accomplished wirelessly. In such embodiments, controller 20 does not have to be in communication with sensor 48 or imaging light source 52.

In operation, an input air and fiber stream is provided by the fiber introduction system 12 through air duct 26. Sensor 48 is placed at the front of the enclosed pathway 30 to detect fibers entering the tube based on the deflected diffused light from laser 44 when the collimated light of the laser 44 hits an individualized fiber entering the enclosed pathway 30. The length of enclosed pathway 30 is such that the fiber F will have entered viewing area 32 before controller 20, or alternatively, sensor 48, activates camera 50 and imaging light source 52. Camera 50 is placed above a viewing area 32 with imaging light source 52 being placed on the other side of viewing area 32 such that fiber F, which is sensed by sensor 48 and passing through viewing area 32, passes between imaging light source 52 and camera 50. Controller 50, or alternatively, camera 50, can fire the imaging light source 52 and camera 50 simultaneously when fiber F is in viewing area 32. Transparent top portion 36 and bottom transparent window 38 permit imaging light source 52 to backlight fiber F so that camera 50 can capture its image for measurement with viewing area 32 maintaining a thin cross-section in order to guarantee little Z-direction mobility to eliminate a need for a second image to determine the length of fiber F. In this manner a single stationary camera 50 can be used to gather the image used to measure the properties of the fiber. Controller 20 can process the image of the fiber to determine the fiber properties, such as length and diameter of the fiber, through the controller's hardware or by software that is used to analyze the image. Examples of fiber measurement systems and different components of the fiber measurement systems will be explained in more detail below. These examples are provided to explain the subject matter and not as a limitation.

Fiber measurement system 10 has been developed with the intent to control the fibers without any form of physical contact with at least the side walls 34 of the viewing area 32. A primary consideration of fiber measurement system 10 can be to maximize the number of fibers completely visible by camera 50. A fiber is completely visible if no portion of the fiber is hidden by either a portion of the fiber guidance enclosure or the edge of the image. Further, fiber measurement system 10 can maximize the contrast between the fiber and the background in order to achieve the highest image quality and fewest broken skeletons. "Broken skeletons" as used herein are areas of an image of the fiber where there is not enough contrast between the fiber and the background resulting in areas of the fiber that show up as background creating multiple fibers where there should only be one. "Broken skeletons" are created by images in which shadows of the fiber or brightness of the light obscure a portion of the fiber to make it appear to separate and distinct fibers instead of a single complete fiber. Fiber measurement system 10 can also reduce the amount of broken skeletons by reducing the amount of bending of the fiber in the Z-direction towards and away from the camera caused by crimp in the fiber. The limited mobility of the fiber in the Z-direction within viewing area 32 reduces this bending of the fiber in the Z-direction. Thus reduction in Z-direction bending permits the image to capture the fiber as it more fully extends in the X- and Y-directions and permits a more uniform illumination of the fiber.

Also, fiber measurement system 10 can maximize the degree to which the fibers are individualized to reduce crossovers. While there are algorithms that account for crossovers, the presence of a crossover still introduces error into the system. Finally, fiber measurement system 10 can minimize any image artifacts that are not fibers to remove them from the image. "Artifacts" as used herein are particles or materials that may be in the viewing area that are not the fibers being measured, such as noise, dust, or fibers trapped in the viewing area, for example. This may include noise, dust, or fibers trapped in the viewing area.

Sensor 48 can detect the presence of an individual fiber moving past it in order to trigger camera 50. Sensor 48 can be both fast and sensitive in order to sense the fast moving fiber. Accurate fiber detection provides proper triggering of camera 50, thereby synchronizing the time of image capture with the fibers arrival in viewing area 32.

Fiber guidance enclosure 16 provides a means to control the fiber as it travels past sensor 48 and into viewing area 32. Fiber guidance enclosure 16 is designed so that it does not obstruct a portion of the fiber from camera 50 or cause fibers to remain in fiber guidance enclosure 16. By carefully selecting the contour of fiber guidance enclosure 16, the path and movement of the fiber can be accurately controlled.

To facilitate the capture of the image, the fibers can be backlit when they are presented in viewing area 32, imaging light source 52 operating as a strobe light can freeze the motion of the fibers as they entered viewing area 32. In order to provide the required contrast for image processing imaging light source 52 needs to be very bright, however, it also needs a short duration. The fiber is constantly moving and the amount the fiber moves during the time imaging light source 52 is on is shown as blur on the image. Blur significantly decreases the ability of controller 20 to accurately analyze the fiber and must be minimized.

Camera 50 can provide control for the timing of sensor 48, strobe, and image capture while also providing high quality images for capture. Camera 50 must be quick enough to capture the image of the passing fiber on short notice.

A sensor 48 can be used that can sense the presence of a fiber and trigger camera 50. If the presence of a fiber can be known downstream from camera 50, it is possible to synchronize camera 50 and sensor 48 so that when a fiber is seen there can be a high probability that it will be captured in its entirety. The next section of the design is an imaging light source 52 which can be bright enough to provide high contrast with the silhouette of the fiber but also strobe fast enough to freeze the motion of the fiber with minimal blur. Imaging light source 52 also can be integrated with camera 50 and sensor 48 so that the imaging light source 52 can illuminate the fiber just as the fiber enters viewing area 32 and camera 50 captures an image thereof. Camera 50 can have a high resolution so that a large viewing area can be used to minimize the negative affects of different fiber speed due to differing masses and aerodynamic properties. Camera 50 can have the capability to be triggered by sensor and provide output to control a strobe light either directly or by controller 20. Controller 20, for example, using software, can control camera 50 so that many images are captured and analyzed to increase the data points and thereby the accuracy of fiber measurement system 10.

The fibers can be delivered to the system using opening roller 22. Opening roller 22 can, for example, use a small rotating cylinder with pins around its circumference to remove individual fibers from a sliver and introduce them into the system. The rate at which fibers were introduced along with the speed of opening roller 22 can be controlled allowing the frequency of fiber introduction to be varied.

The fibers can be transported using suction, from opening roller 22, past sensor 48, through viewing area 48, and finally out of outlet 40 and outlet duct 42 to be disposed of. Fiber guidance enclosure 16 can be built using static dissipative material, for example, static dissipative material acrylic to ensure no static builds up on the surface and causes the fibers to stick to fiber guidance enclosure 16. Fiber guidance enclosure 16 is designed such that the fiber would be introduced into the center of the viewing area minimize the amount of contact that the fibers would have with fiber guidance enclosure 16, avoiding imaging errors.

Sensor 48 can be placed at the entrance of fiber guidance enclosure 16 to detect fibers as they pass, and trigger camera 50. Sensor 48 can be of a photodiode which detects laser light from laser 44 reflected off of passing fibers. The collimated nature of laser light ensures that when no fiber is present the light reaching the photodiode will be minimal; however, when a fiber is present, the reflected light will produce a measurable change in the photodiode output. The output from the photodiode is input into an op-amp configured as a difference amplifier with the other input coming from a potentiometer configured as a voltage divider. This allowed the output from the difference amplifier to be adjusted just below the voltage required to turn a transistor "on". When a fiber is present, the output voltage can increase and trigger a transistor which then triggers camera 50.

Camera 50 is synchronized with the strobing of imaging light source 52 and sensor 48 so that when the fiber enters viewing area 32, imaging light source 52 flashes and camera 50 captures the image. Imaging light source 52 can be two horseshoe shaped flash bulbs and the accompanying circuitry. The energy for each flash can come from a voltage multiplier that converts 120V AC to about 340V DC. The flash can be triggered using an optoisolator coupled to a Silicone Controlled Rectifier and a trigger coil. The correct imaging light source 52 can provide an intense, short duration flash that "freezes" the motion of the fiber and provide an image of the silhouetted fiber.

After an image is captured, the controller 20 analyzes the image to extract the length of any fibers within the image. The first step in analysis can include applying a mask that is created during calibration to eliminate consistently dark or light areas in the image and significantly improve image quality. The image can then be thresholded based on the average of the image to create an image containing only two grey levels in order to facilitate future processing. A number of analysis algorithms can be used to isolate fibers from the background, thin the fibers, and finally count the number of pixels making up the fiber. The visual interface can then convert the pixel number to a length based on a calibration value and saves each length in a database. The visual interface can save all individual fiber data along with a number of other parameters describing each sample.

Fiber measurement system 10 can be controlled through a visual interface on controller 20 allowing the user to control the opening roller 22 and camera 50. To control the opening roller 22, controller 22 can include software that controls a programmable logic controller ("PLC") coupled to a relay which turns on and off the opening roller motor. Camera can be controlled using C functions called by the visual interface through a dynamic linked library ("DLL"). The data collected from the samples are stored in a database which is also accessed using the visual interface. By allowing all aspects of the fiber measurement system to be controlled through one interface, the operation of the system is greatly simplified.

Sensing system 14 will now be described in more detail. Sensing system 14 can include light generator to create light energy that can reflect off of passing fibers and sensors to detect the reflected light energy. There are a few criteria that can be addressed in either the selection or design of such a sensor 48. First, sensor 48 should reliably detect the presence of a single fiber, while not giving erroneous readings when fibers were not present. Second, sensor 48 should have a very short response time since the fibers are moving at a high speed and are only present in front of sensor 48 for a short time. Third, sensor 48 can detect a fiber without any physical contact with the fibers. If sensor 48 were to contact the fibers there would be a high probability of fibers becoming entangled with sensor 48 creating a clog in the input area.

There are many sensors that can convert light energy into either a voltage or a change in resistance, both of which can easily be used to sense the presence of light. For example, photodiodes and phototransistors actually convert light energy into a small detectable voltage, while photoresistors change resistance in the presence of light. These types of sensors provide a means with which to detect the presence of light. The reflected light can easily be detected by a photodiode, phototransistor, or photoresistor positioned above the fiber, about 90° from the path of the light. However, these sensors can be at different angles from the path of the light other than 90° as long as the angle is such that it sufficiently detects light that reflects off the passing fiber and not detect the light from fiber illumination source that is not reflected. Photodiodes, phototransistors and photoresistors are commonly used sensing technologies and will not be described in further detail. Again, other light sensing technologies can be used as are conventional.

As stated above, the fiber illumination source can be laser 44. The collimated nature of laser light ensures that when there is no fiber present very little of the laser light reaches sensor 48; however, when a fiber is present, laser 44 illuminates the fiber and reflected light would reach the sensor 48. Sensor 48 can be designed using a laser positioned about perpendicularly to both the fiber direction and the sensor. The fiber would pass through the laser and the light would reflect off of the fiber illuminating the sensor causing a voltage change.

Figure 2:
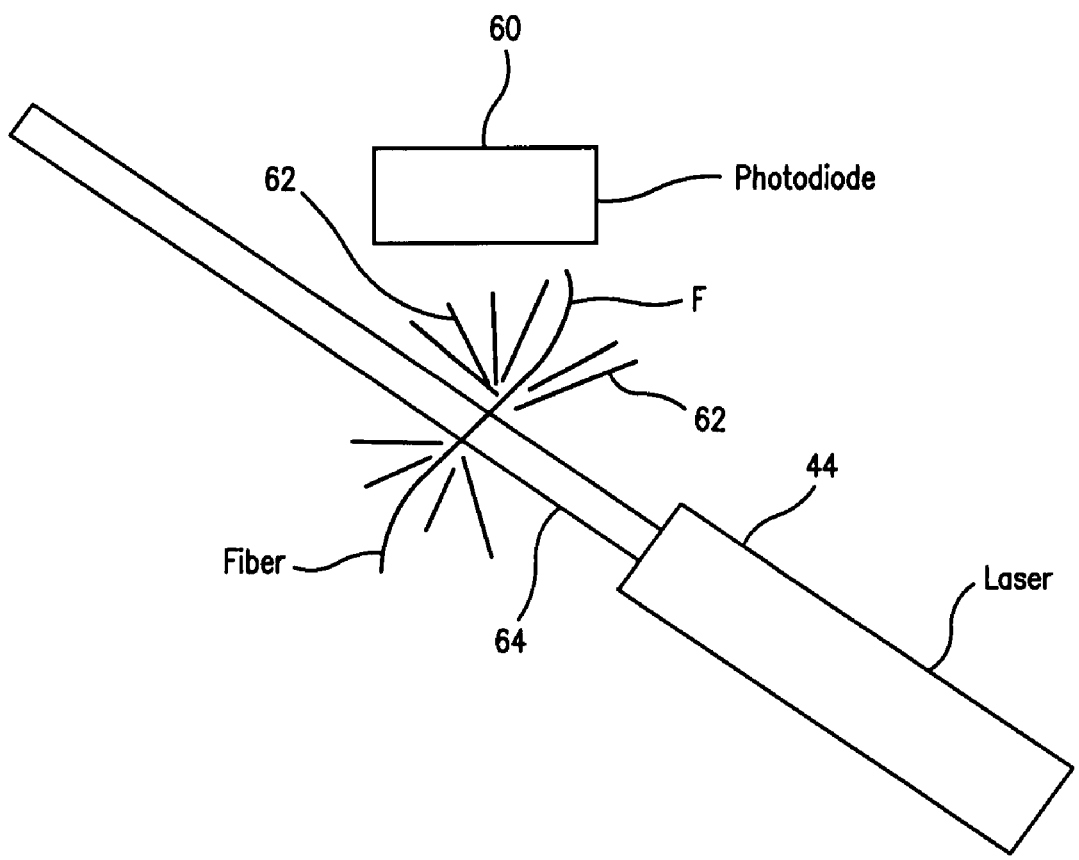
FIG. 2 illustrates a schematic view of an embodiment of at least a portion of a sensing system that can be employed in the fiber measurement system according to FIG. 1.

As shown in the schematic of FIG. 2, a photodiode 60 can be used to detect the reflected light 62. As fiber F passing through collimated light 64 of laser 44, photodiode 60 is positioned to intercept reflected light 62 off of the passing fiber F, while not receiving significantly perceptible amounts of the collimated light 64 directly from laser 44. One example of a sensor 48 is an OPT101® photodiode, which is a Burr-Brown product from Texas Instruments, Incorporated of Dallas, Tex., can be used due to a good spectral response to the lasers wavelength and an integrated op amp. Matching the spectral response of the photodiode with the wavelength of the light source helps to achieve the largest possible voltage change, because the sensor is more likely to be sensitive to the same wavelength of light that the laser is producing. The OPT101® has a wide response band and is an acceptable response to that wavelength. An integrated op amp can be used since the actual voltage change when a fiber is present is on the order of a hundredth of a volt and therefore difficult to integrate into a circuit without amplification.

Photodiodes are more sensitive to certain wavelengths of light than others. Therefore, matching the light generator to the photodiode became the main criterion when selecting a laser 44. Lasers are widely available at red wavelengths. However, some lasers can be in blue or green wavelengths. Further, IR laser may be used. The laser can be relatively simple, requiring no special features or optics and can have an adjustable focus. The adjustable focus can allow the beam to be concentrated on the point where each fiber would pass. While the laser light is generally primarily parallel, it can diverge slightly. By adjusting focus, the beam can be focused on a point beneath photodiode 60 thus reducing the amount of light reaching photodiode 60 when no fiber is present.

Laser 44 can have a wavelength that falls within the optimal response range of photodiode 60 and have a power rating less than 5 mw. Further, laser 44 can have an external power supply. For example, laser 44 can require 3 V at 45 mA which is easily provided by the 13.8 V power supply and a simple voltage divider.

To effectively control camera 50, sensor 48 can send a signal to camera 50 to trigger the firing of the camera 50 and/or the imaging light source 52. The signal can be sent through controller 20 which sends a triggering signal to camera 50. Alternatively, sensor 48 can be connected directly to camera 50 and/or imaging light source 52 by a triggering device or circuit which triggers the firing of camera 50 and/or imaging light source 52. Such triggers are commonly known. For example, triggers are described in the manual for the Pixelink PL-A781 and PL-A780, manufactured by Pixelink, Ottawa, Ontario. The manual entitled "PL-A780 System Guide," published by Pixelink, Ottawa, ON (2004) is incorporated by reference herein in its entirety.

Referring now to FIGS. 1 and 3-10, fiber guidance enclosure 16 will now be described in more detail. Fiber guidance enclosure 16 allows the fibers to be controlled in the Z-direction while minimizing physical contact with fibers against the side walls 34. Fiber guidance enclosure 16 can provide inlet 28 into which air duct 26 transports individualized fibers. Inlet 28 can provide a smooth transition from the round air duct 26 to the rectangular enclosed pathway 30. A smooth transition can aid in avoiding fiber entanglements or fibers getting stuck which can either increase error due to excess entanglements or cut off flow of the fibers to the viewing area rendering that run useless. Inlet 28 can include a top half 28A and a bottom half 28B (see FIGS. 6-8) that can be configured to fit together to create a transition 71 from round conduit 70 to rectangular conduit 72 (see FIGS. 3 and 6). Conduit 72 has a lesser height in the Z-direction at any given cross-section than the height of round conduit 70. At the same time, Rectangular conduit 72 has a greater width in the X-direction at any given cross-section than the width of round conduit 70.

Figure 7:
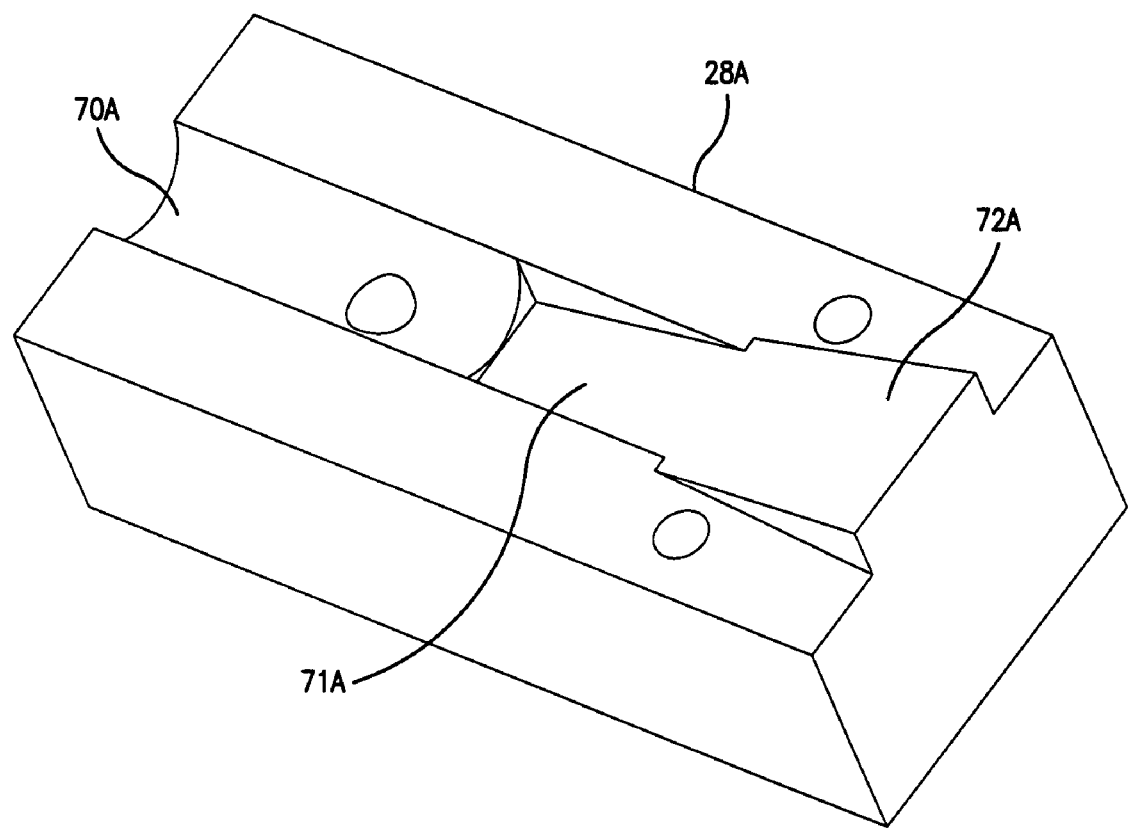
FIG. 7 illustrates a perspective view of a top portion of the inlet according to FIG. 6.
Figure 8:
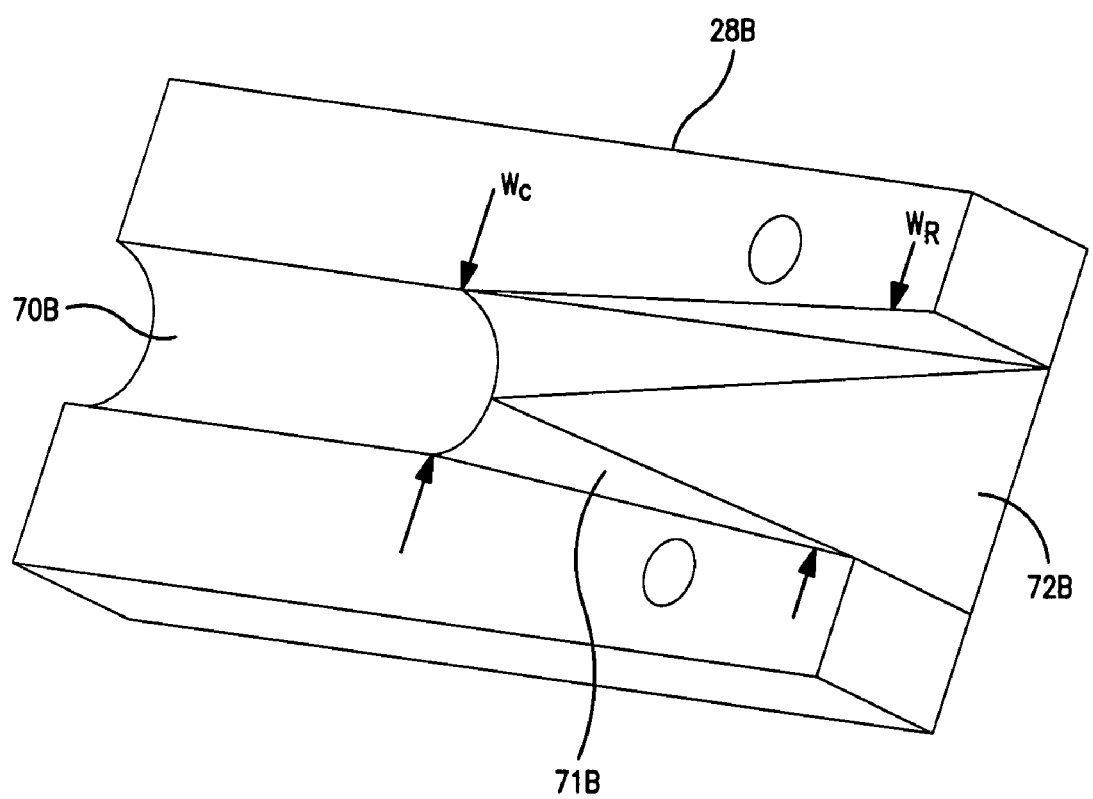
FIG. 8 illustrates a perspective view of a bottom portion of the inlet according to FIG. 6.

As shown in FIG. 7, top half 28B of inlet 28 can have a conduit section 70A that corresponds to the top half of round conduit 70. A conduit section 71A of top half 28A can be flat and rectangular and form a top portion of transition 71. A conduit section 72A of top half 28A can be flat and rectangular and can form a top portion of rectangular conduit 72. Conduit section 72A can be wider than conduit section 71A. As shown in FIG. 8, bottom half 28B of inlet 28 can have a conduit section 70B that corresponds to the bottom half of round conduit 70. Conduit section 71B of top half 28A can transition from a rounded bottom of conduit section 70B to a flattened bottom of conduit section 72B. Conduit section 71B can form a bottom portion of transition 71 and conduit section 72B can form a bottom portion of rectangular conduit 72. The width of conduit section 71B also changes from a width $W_C$ at the rounded conduit section 70B to a wider width $W_R$ at the rectangular conduit section 72B.

By placing top half 28A into bottom half 28B, an inlet 28 is formed that transitions a round conduit 70 with greater height and narrower width in transition 71 to the rectangular conduit 72 with lesser height and greater width that matches the height and width of enclosed pathway 30. The design of top half 28A and bottom half 28B of inlet 28 with the round conduit 70, transition 71, and rectangular conduit 72 can lead to a smoother transition from air duct 26 to enclosed pathway 30 for the.

Figure 3:
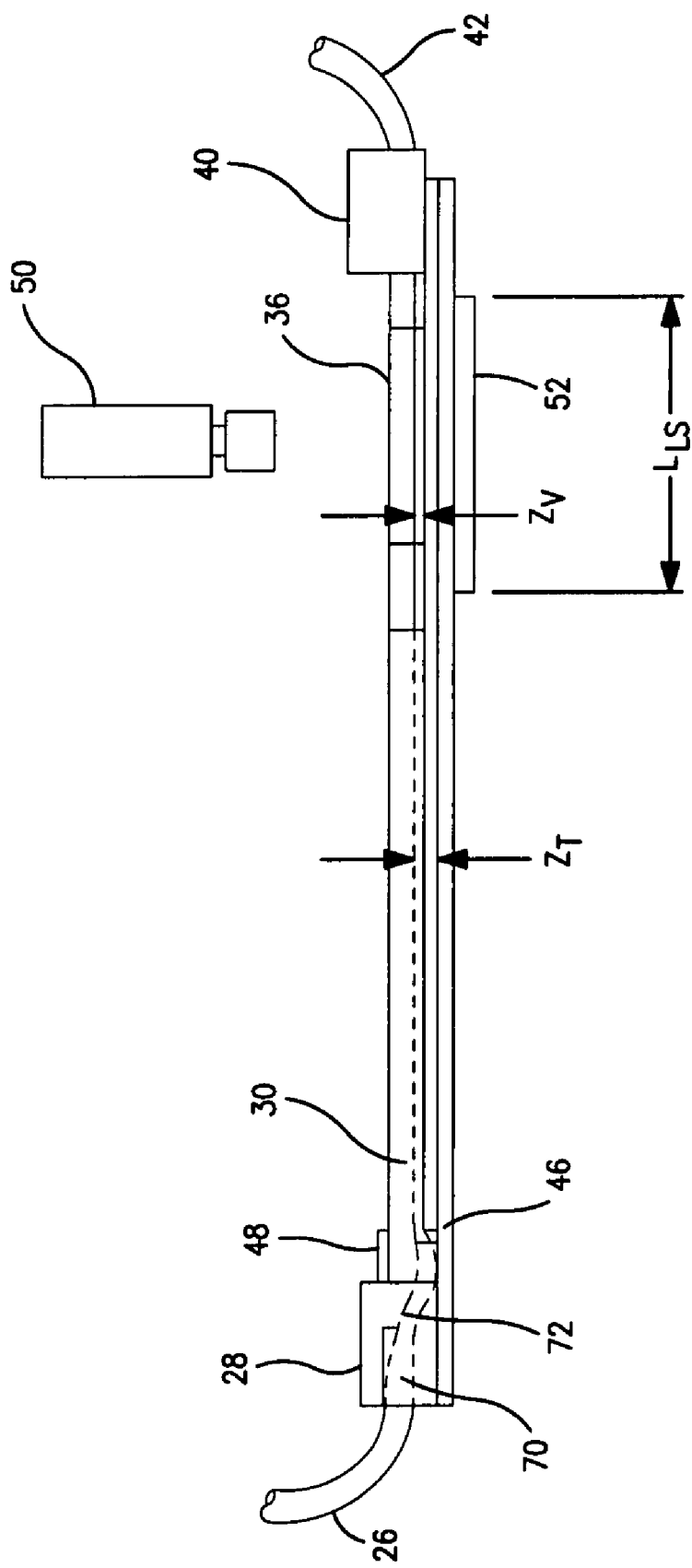
FIG. 3 illustrates a side view of a portion of the fiber measurement system according to FIG. 1 including the fiber guidance enclosure.
Figure 4:
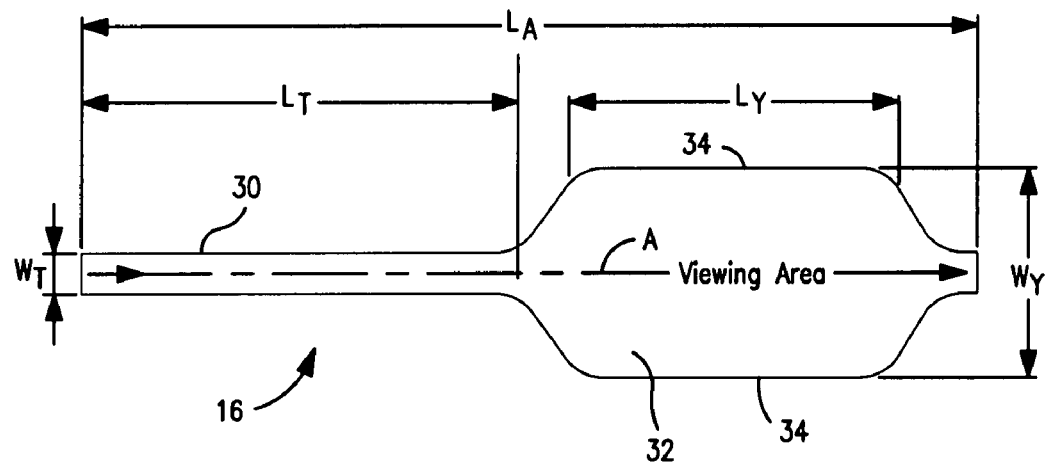
FIG. 4 illustrates a top cross-sectional schematic view of the fiber guidance enclosure of the fiber measurement system according to FIG. 1.
Figure 5:
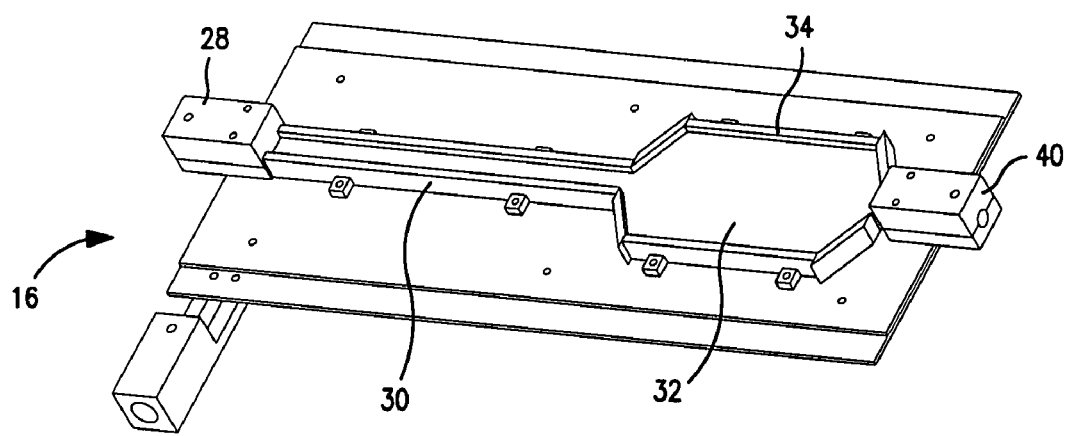
FIG. 5 illustrates a perspective view of the fiber guidance enclosure of the fiber measurement system according to FIG. 1.
Figure 6:
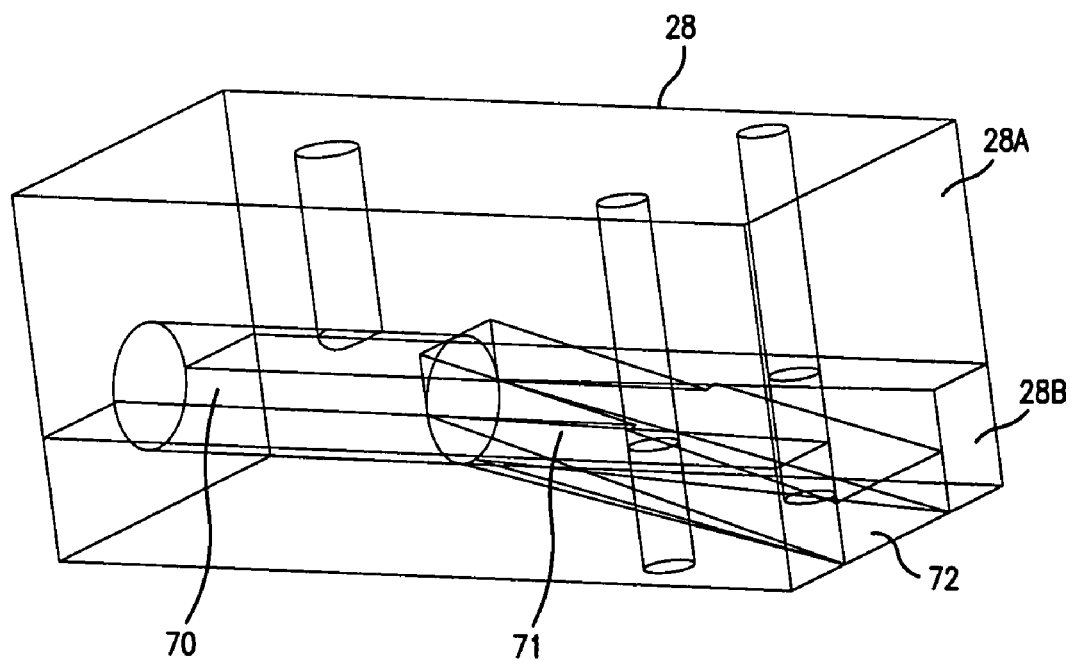
FIG. 6 illustrates a transparent perspective view of an embodiment of an inlet that can be used in the fiber guidance enclosure of the fiber measurement system according to FIG. 1.

Referring to FIGS. 3, 4 and 5, fiber guidance enclosure 16 has an overall length of $L_A$ that based on the speed at which the air transports the fibers provides time to detect the incoming fibers, take the image of each incoming fiber and provide an adequate area to get a full image of each fiber. Length $L_A$ of fiber guidance enclosure 16 includes a length $L_T$ of enclosed pathway 30 and a length $L_V$ of viewing area 32. Length $L_T$ of enclosed pathway 30 has to be long enough to provide adequate time to detect the incoming fiber, trigger and prepare camera 50 and take the image of the fiber with camera 50, while providing control to the fiber so that it is adequately placed in the viewing area without being drawn to the sidewalls 34. Such distance is a factor of processing speed of the camera, sensor and controller and the speed of the air. Length $L_V$ of viewing area 32 should be great enough to provide a full image of the fiber, while permitting suction from outlet 40 and outlet duct 42 to aid in maintaining a more central position of the fiber in viewing area 32 so that the fiber is not touching sidewalls 34.

In one embodiment for viewing cotton staple fiber, for example, the length of enclosed pathway 30 can be between about 5 inches and about 6 inches, for instance about 5.25 inches. The length of viewing area can be between about 3 inches and 4 inches, for instance about 3.25 inches. Such a distance can easily accommodate a 1.25 inch fiber allowing room on either side to ensure the fiber is in frame. However, the lengths can be other distances and still provide accurate measurements. The distances of the lengths of the enclosed pathway 30 and viewing area 32 can also be affected by transport speed of the fibers, the speed of the imaging system can controller and the types of fibers being measured.

Similarly, enclosed pathway 30 can have a width $W_T$ that directs the incoming fibers generally straight and in combination with the internal surface of enclosed pathway 30 does not snag or hold the fibers. Viewing area 32 can have a width $W_V$ that is much greater that width $W_T$ of enclosed pathway 30. The greater width $W_V$ allows the incoming individualized fibers freedom to travel therein with less likelihood that they will drift and contact side walls 34. For example, the width $W_V$ of viewing area 32 can be more than two times larger than the width $W_T$ of enclosed pathway 30. For example, viewing area 32 has a width ranging between about 2 to about 16 times the width of the enclosed pathway 30. For instance, the width $W_V$ of viewing area 32 can be about five times larger than the width $W_T$ of enclosed pathway 30. Enclosed pathway 30 and viewing area 32 are aligned along an axis A such that enclosed pathway 30 feeds the incoming fibers toward a middle of viewing area 32 with sidewalls 34 spaced apart about equidistance from axis A. Thereby, fiber guide enclosure 16 widens about equally on both sides as fiber guidance enclosure 16 transitions from width $W_T$ of enclosed pathway 30 to width $W_V$ of viewing area 32. Fiber guidance enclosure 16 can taper with softened contours from width $W_T$ of enclosed pathway 30 to width $W_V$ of viewing area 32 to help decrease turbulent airflow. Width $W_V$ should be great enough decrease the likelihood of the fiber drift toward sidewalls 34 while permitting suction from outlet 40 and outlet duct 42 to aid in maintaining a more central position of the fiber in viewing area 32.

In one embodiment for viewing cotton staple fiber, for example, the width of enclosed pathway 30 can be about 0.5 inches and the length of viewing area 32 can be about 2.5 inches. However, the widths can be other distances and still provide accurate measurements. The distances of the widths of the enclosed pathway 30 and viewing area 32 can be affected by transport speed of the fibers and the types of fibers being measured, for example.

As shown in FIG. 3, enclosed pathway 30 can have a height $Z_T$, while viewing area can have a height of $Z_V$. Height $Z_T$ of enclosed pathway 30 and height $Z_V$ of viewing area 32 can be about equal and can be set at a distance that aids in providing little Z-direction mobility with regard to the camera. In some embodiments, the height $Z_V$ of viewing area 32 can be less than height $Z_T$ of enclosed pathway 30. In such embodiments, height $Z_T$ of enclosed pathway 30 can have a smooth transition to the height $Z_V$ of viewing area 32. The distance or distances of height $Z_T$ of enclosed pathway 30 and height $Z_V$ of viewing area 32 can be between about 0.001 inches to about 0.25 inches. This allows for all portions of the fibers to be in focus at once and prevents significant error in length measurement due to the making of a two-dimensional projection from a three-dimensional fiber shape. This can also help to minimizes broken skeletons. For example, the distance or distances of height $Z_T$ of enclosed pathway 30 and height $Z_V$ of viewing area 32 are much less than the distance of width $W_T$ of enclosed pathway 30. For example, the distance or distances of height $Z_T$ of enclosed pathway 30 and height $Z_V$ of viewing area 32 can be about one and a half to three times less than the distance of width $W_T$ of enclosed pathway 30. For example, the height $Z_T$ of enclosed pathway 30 and height $Z_V$ of viewing area 32 can be about 0.125 inches and the width $W_T$ of enclosed pathway 30 can be about 0.5 inches.

The limited Z-direction mobility makes the two-dimensional projection from the image captured by the camera 50 a more accurate portrayal of the three-dimensional fiber shape by reducing the amount of bending of the fiber in the Z-direction towards and away from the camera caused by crimp in the fiber. The limited mobility of the fiber in the Z-direction within viewing area 32 reduces this bending of the fiber in the Z-direction. Thus, reduction in Z-direction bending permits the image to capture the fiber as it more fully extends in the X- and Y-directions and permits a more uniform illumination of the fiber. Thereby, only a single generally stationary camera 50 can be used to capture a single image or set of image data that is used to measure the fiber properties such as length.

Summarily, by controlling the fiber within enclosed pathway 30 and releasing it into the wider viewing area 32 along axis A, the chances are greatly decreased that the fiber will move toward the edge before it was redirected by the suction. The length of the enclosed pathway 30 and viewing area 32 permit control and full imaging of the fiber. The long entry enclosed pathway also gave the camera time to reset before the image was captured allowing the position of the fiber to be controlled by the timing and the airspeed. Further, the height of both enclosed pathway 30 and viewing area 32 increase the likelihood of a better and more accurate image taken by camera 50. Overall, the design was an effective method to deliver fibers to the viewing area in a consistent and controlled manner.

Figure 9:
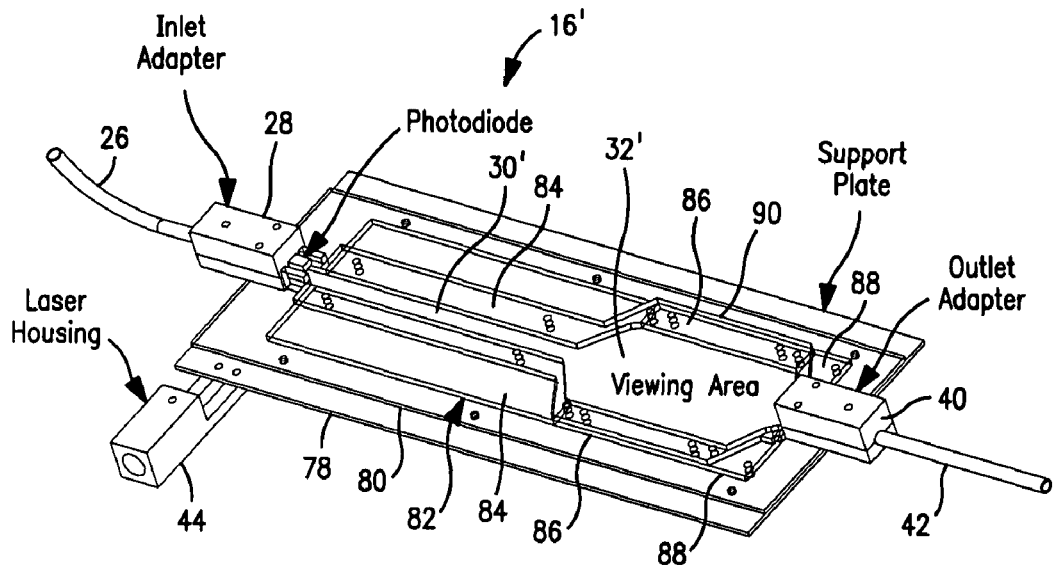
FIG. 9 illustrates a perspective view of another embodiment of a fiber guidance enclosure that can be used within an embodiment of a fiber measurement system according to the present subject matter.
Figure 10:
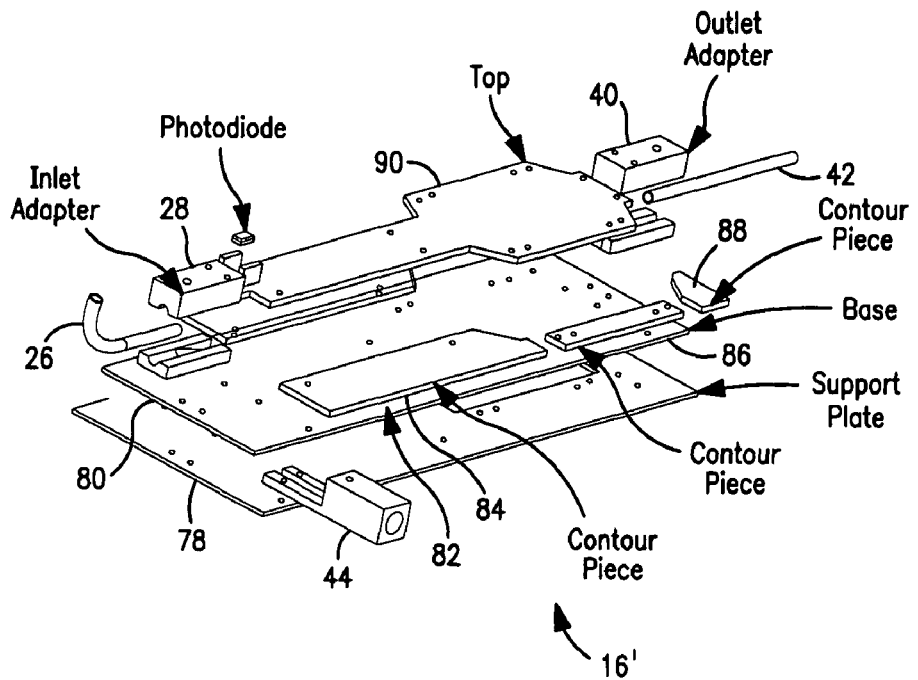
FIG. 10 illustrates an exploded view of the fiber guidance enclosure according to FIG. 9.

Fiber guidance enclosure can be constructed of layers as shown in FIGS. 9 and 10 to increase the uniformity of the enclosed pathway and viewing area height. A sandwich was made by using three layers of materials. For example, the layers can be 0.125 in thick static dissipative acrylic. A support plate 78 can be provided that includes an opening for the transparent window of the light source that backlights the incoming fiber for taking the image thereof for measurement. A first layer 80 can be a rectangle and acted as the bottom surface for the enclosed pathway 30'. Layer 80 can be transparent to create the transparent window with support plate 78 for the light source. A second layer 82 can include many contoured pieces 84, 86, 88 machined to create the proper contours for the enclosed pathway 30 and viewing area 32'. A third layer 90 can be machined to create a transparent top portion for the enclosed pathway and viewing area through which an image taking device such as a camera can be used to capture an image of the individualized fibers as they pass through the viewing area. Third layer 90 overlaps second layer 82 and the pieces 84, 86, 88 that comprise it. The contours of second layer 82 can be designed to create the desired enclosed pathway 30' and viewing area 32'. By using a sandwich structure, the contour of enclosed pathway 30' and viewing area 32' can easily be created while ensuring a uniform height throughout. Other similar components such as air duct 26 inlet 28, outlet 40 and outlet duct 42 can be used in a similar manner as described above.

Fiber guidance enclosure 16' created by such a sandwich technique can allow everything to be bolted together except for the area through which the laser beam would pass. Sharp transitions between the entrance enclosed pathway and the viewing area, and the viewing area and the exhaust enclosed pathway can be smoothed to try to eliminate any turbulence caused by the sharp edges. Inlet 28 and outlet 40 at the ends can comprise two interlocking pieces as described above that can be clamp air duct 26 and outlet duct 40, respectively, and channel the air into enclosed pathway 30' and viewing area 32' between the layers 80, 82, 90.

To prevent significant numbers of fibers from sticking to the top or bottom of the fiber guidance enclosures 16, 16' due to the static that develops on the surfaces, the fiber guidance enclosures 16, 16' can be constructed from static dissipative materials. For example, by using a static dissipative acrylic for all of the surfaces, the static can be eliminated. Other materials that are effective in reducing static can also be used. Such materials should have rigidity so that the air duct 26 and outlet duct 42 can be securely mounted to the enclosures and so all of the plastic enclosure pieces can be bolted tightly together to minimize air leaks. A rigid plate can be used as a support plate to provide sufficient rigidity. For example, the support plate can be a metal, wood, or a hardened plastic. For instance, the support plate can comprise aluminum which is easy to machine and provides the necessary rigidity.

The fiber guidance enclosures described above provide control of individual cotton fibers and deliver them first past a sensor and into a viewing area in a continuous and repeatable manner. The dimensions of the enclosure can ensure the fiber will be controlled and not allowed to contact the edges or sidewalls during imaging and also ensure ample time between sensing and imaging for the camera to reset itself and capture the image. The materials chosen eliminated static while providing the clearest image possible to increase the chance of accurate software analysis.

Figure 11:
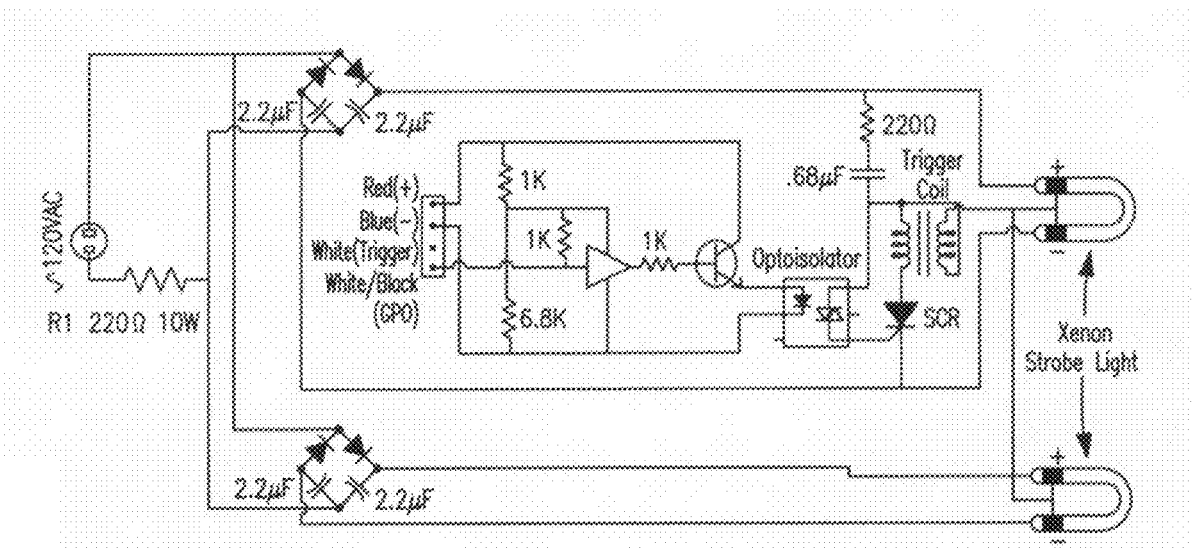
FIG. 11 illustrates a schematic diagram of an embodiment of an imaging light source circuit that can be used within an embodiment of a fiber measurement system according to the present subject matter.

Referring to FIGS. 1 and 11, imaging system 18 will now be described in more detail. Lighting can effect the capturing of images. The proper lighting can produce a very crisp useful image, while improper lighting can produce an image that is blurry, too bright, or to dark; rendering the image useless. While there are numerous different lighting sources available, fewer possibilities exist when considering strobing light sources. A strobe light technology such as the Xenon strobe can be used which is known for its high intensity and short duration flash. Imaging light source 52 that provides a backlighting configuration should be a uniform light source to provide illumination resulting in a high contrast silhouette of the fiber, optimizing the image for processing. Imaging light source can be dependent upon the type of camera or other image capturing device. For example, Imaging light source can be strobe lighting, such as strobing LED's, Xenon strobes, etc., or continuous lighting, such as halogen, incandescent, LED's, etc. Continuous light sources would be used with cameras with a high speed shutter. Other cameras can be used in conjunction with strobing light sources. The ability to strobe freezes the motion of the fiber eliminating blur and resulting in a clear image. Camera 50 or Controller 20 can trigger imaging light source 52 in order to synchronize the shutter of camera 50 and the light so that the image is captured when light is triggered and a fiber is present in the viewing area 32.

As mentioned above, xenon strobes can provide a high intensity short duration flash useful for freezing the motion of moving parts. A xenon flash lamp can include a fused quartz tube filled with xenon gas, along with three electrodes; a positive electrode, a negative electrode, and an electrode used to apply a high voltage to the gas. In a xenon flash lamp, the xenon gas can act as a filament conducting the electricity between the two electrodes. Under normal conditions, the gas does not act as a conductor and the potential difference between the two electrodes is not enough to jump the gap. When a small transformer known as a trigger coil applies a high voltage (~4 kV) to the third electrode, the gas becomes ionized and conductive. Current can now flow between the positive and negative electrode and the rapid discharge results in a flash. Energy can be stored prior to discharge in a capacitor, the size of which affects the duration and intensity of the strobe. A smaller capacitor will produce a shorter, less intense flash, while a larger capacitor will produce a longer more intense flash.

Xenon strobes can provide an extremely high luminous intensity of 250,000 candela or more which is significantly higher than conventional LED's whose luminous intensity is on the order of 10 candela. Xenon strobes also provide the capability to obtain very short duration flashes on the order of 1 microsecond. While LED's are technically capable of flashes that short, the intensity of the flash also decreases along with the duration. Xenon flashes can contain a complete spectrum of wavelengths between 150 nm all the way up to 6 µm. To the human eye the light appears to be white but with the use of different types of filters any specific wavelength can be extracted to meet a specific need.

An example of a strobe that creates a satisfactory intensity with adequate duration when triggered by the camera is illustrated in FIG. 11. The core of the circuit can be two large capacitors and two diodes configured as a voltage multiplier to ramp up the input voltage of 120 VAC up to about 300V DC. Such capacitors can provide the primary power source for the strobe. The duration of the flash is related to the size of the capacitors in the circuit. For example, smaller capacitors allow for shorter flash durations, but smaller capacitors do not store as much charge and therefore create a less intense flash resulting in an image of lower quality for the software to effectively analyze. A larger capacitor tends not to blur the fibers beyond what the software could analyze. The strobe can be triggered using a capacitor to drive a trigger coil, which can be triggered using a silicone controlled rectifier (SCR) coupled to an optoisolator and a transistor. The trigger coil can be simply a transformer used to increase the voltage to approximately 4 kV which ionizes the gas in the strobe tube and allow the current to flow between the anode and the cathode causing the flash. The SCR can function like a transistor and allow high voltages to be switched on and off accommodating the high voltages needed to operate the trigger coil. An optoisolator can be used to eliminate the possibility of damaging the low voltage circuitry on the camera side. An optoisolator is generally an LED and a photodiode combined into one integrated circuit allowing light to connect two electrical circuits eliminating any chance of damaging the camera. The transistor can be used to trigger the optoisolator, which in turn can trigger the SCR. The triggering of the SCR then can switch on the trigger coil at which point the gas can be ionized, increasing its conductivity, and causing the capacitors to discharge across the gap causing a flash.

Theoretically, the capacitors can be continually decreased to decrease the flash time. Capacitors of various sizes can be used. For example, a 2.2 µf capacitor can be used which can reduce the strobe duration. To increase the intensity a circuit can be built that can trigger two strobe lights simultaneously to ensure a bright uniform image as shown in FIG. 11. Such a circuit is essentially two independent strobe lights running off the same power source and triggered by the same trigger coil. Any delay between the two strobes can cause the background of the image not be uniform. By combining two strobes using smaller capacitors, the intensity is not decreased significantly and the duration can be decreased to approximately 6 µs which is sufficient for quality images.

The flash speed for the xenon strobe is approximately 6.5 µs. To achieve less than a pixel of blur, a flash duration of about 1 µs can be used Imaging system 18 also includes an image capturing device such as camera 50. The primary purpose of camera 50 is to acquire an image via a lens and a sensor and convert that image to a digital form which can be saved and processed using a controller 20, such as a computer. The secondary purpose of the camera 50 can be to provide the control over the light source through the use of output triggering. In other embodiments, controller 20 can be in communication to control both the camera 50 and imaging light source 52. While still considering image quality, resolution can be a concern as it will affect the contrast of features within the image along with the processing time after the image is captured. For general vision, digital cameras that have Charge Coupled Device and Complimentary Metal Oxide Semiconductor chips can be used.

Charge Coupled Devices can include a 2D array of photodetectors (either photodiodes or photogates) arranged in a series of rows and columns on a chip. The photodetectors can accumulate a charge related to the amount of light reaching the individual photodetector. The charge from each photodetector can be converted into a voltage, buffered, and transferred off the chip where the voltage is converted to a pixel value.

Complimentary Metal Oxide Semiconductor ("CMOS") chips are similar to CCD in that they can include a 2D array of photodetectors, usually photodiodes, which accumulate charge proportional to the amount of light present. The CMOS chips differ in that they can contain a charge amplifier at each photodetector site instead of a single charge amplifier for all the pixels. Converting the charge to voltage at each pixel allows each pixel to be addressed individually which allows the user to define a specific region of interest.

While cameras with CMOS chips or CCD chips can be used, other cameras and image capturing devices can be used. For example, camera with a high speed shutter can be used in conjunction with an imaging light source that provides continuous light.

Camera 50 can be high resolution. When analyzing backlit fibers, controller 20 in the form of software can compare pixels looking for contrast and with higher resolution there can be more pixels in the transition between a fiber and the background. With more pixels, the pixels of the fiber will be less likely to be averaged with the background causing a lower pixel value for the center pixels, resulting in easier processing and better results. Since each pixel will be compared to the average for the image, the darker the pixels associated with the fiber the better the post thresholding image will be. While the lower resolution image can still be analyzed, there will be more broken skeletons causing false fiber length readings. As defined above, broken skeletons are areas of an image of the fiber where there is not enough contrast between the fiber and the background resulting in areas of the fiber that show up as background creating multiple fibers where there should only be one.

Camera 50 can have the capability to be hardware triggered to ensure that sensor 48 can control the firing of camera 50. Hardware triggering refers to the ability to either provide a high signal or ground to a wire connected directly to the camera to cause it to capture an image. Software triggering and continuously capturing images are other common configurations for controlling cameras that can be used with fiber measurement system 10. Software triggers and continuo triggers can work to trigger camera 50 as well.

Camera 50 can be easily integrated with external electronics used to both trigger and be triggered by the camera. Integration of sensor 48, camera 50, and imaging light source 52 can permit all timing to be precisely controlled through the cameras software. A camera trigger can be used to control camera 50. The trigger can link sensor 48 to camera 50. Sensor 48 can provide a signal when a fiber is present to trigger the firing of camera 50. Not only can an external circuit control when camera 50 captures an image but camera 50 can be used to output a signal used to strobe imaging light source 52. By using the camera to control the strobe light, the timing can be precisely set allowing the camera, light, and fiber to be synchronized allowing there to be a fiber in the field of view each time an image is captured.

Referring to FIGS. 1 and 12-27, controller 20 will now be described in more detail. As described above, controller 20 can include hardware and/or software that can be used to operate fiber measurement system 10 and analyze the images and any other collected data to develop fiber measurements. Controller 20 can be in communications with imaging system 18, sensing system 14, and fiber introduction system 12. In particular controller 20 is in communications with camera 50 to receive the images captured by the camera 50 to provide analysis thereof. Specifically, a fiber analysis software can provide the necessary analysis to generate pertinent measurements and population and distribution data. Such software can reside in the controller or in the camera. Alternatively, the controller can be integral to the camera in some embodiments.

The fiber analysis software can include image capture software. The image capture software can include algorithms that modify the image in the form of a 2D array. This is a convenient form for an image because it makes visualizing what the code is doing very easy compared to other methods that could be used to store the image. The image capture software can ensure that the image that is captured is converted to the form the fiber analysis software is expecting. The fiber analysis software can be also used to set all of the features of camera 50 including the input and output trigger settings and delay times. A number of different functions can be created to simplify the task of configuring the settings, and capturing images. Using many different functions allows the visual interface to call each function to configure different settings. When capturing images, the main control function can easily get a new image in the proper form by simply calling the appropriate function.

The first step in analysis can be to apply a mask that can be created during calibration to eliminate consistently dark or light areas in the image and significantly improve image quality. The mask can be created by taking 50 images with no fiber or any other object in the image. For each image taken the average pixel value is calculated, and then the difference between each pixel value and the average value. For each pixel the difference from the average over the 50 images is averaged to yield an average difference for each pixel. If there are any small scratches on the top or bottom plate, slight intensity variations from top to bottom, or other factors causing consistent variation throughout the image the mask will fix the error. The mask is then subtracted from each image as the data is taken to cover the known areas of error.

Once the image is captured and in the proper form, the analysis algorithms of the fiber analysis software can be called sequentially to process the image. The first algorithm can be a thresholding algorithm.

Thresholding can be used to take an image that consists of different grey levels and convert it into a form that is black and white allowing the subsequent functions to process the image. Local and global thresholding are the two main methods that can be used to threshold an image. These thresholded images can be filtered with a Fast Fourier Transform algorithm or further processed without being filtered with a Fast Fourier Transform.

When the images from the new camera are thresholded, the contrast between the fiber and the background can sometimes be low and thus limited the quality of the thresholded image. With less contrast between fiber and background there will be significantly more background noise which creates problems for future algorithms. For example, if the average pixel value for the entire image is 200 and the average value for a fiber is 180 the cutoff value can be placed at 185 to ensure all fiber pixels are changed to white since they are less than 185 and all background pixels are black since they are greater than 185. Conversely, if the average for the image is 200 and the fiber is only 190, the cutoff could be placed at 195 and there is a good chance that many of the background pixels would be below 195 due to non-uniformity of the background. This creates a distinct white area where the fiber is located; however, there is also a significant amount of noise in the background.

Figure 12:
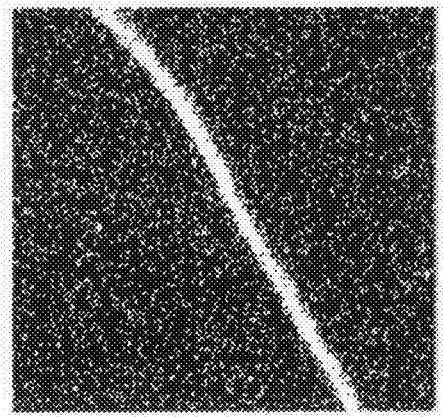
FIG. 12 illustrates an image of further fiber after being filtered with a threshold algorithm.

What also happens is that pixels within the fiber are over the cutoff value and therefore are turned black. This poses a problem during thinning because that section of the fiber cannot be removed and loops are created around the hole, which skew the length measurement. For example, FIG. 12 shows such a thresholded image that illustrates these shading problems.

Figure 13:
FIG. 13 illustrates the image of the fiber in FIG. 12 after being filtered with a threshold algorithm and a fill function algorithm.

A simple function known as fill can fix both of these problems. When fill is implemented by the fiber analysis software, it is told which type (white or black) of pixel to search for and how many neighbors of the opposite type that pixel needs before it will be filled in. For example, if the function is told to look for a black pixel with 7 white neighbors, the function will search until it finds a black pixel and then count the white neighbors. If the number is greater than or equal to 7 then the pixel is changed to white. This exact situation is used to change pixels within the fiber to white to avoid any measurement error. The same effect can be used to remove noise by searching for white pixels surrounded by black neighbors and then turning them black. For example, FIG. 13 shows such the thresholded image of FIG. 12 after a fill function has been run by the fiber analysis software.

This function is very simple and effective in preparing an image for further processing. It can be called many times with varying parameters to create the best final image possible. The function is slow because it has to look at every pixel and then count the neighbors of the ones that it is searching for.

While not optimal, the fill function and the global thresholding create good overall images in a reasonable time.

Figure 14:
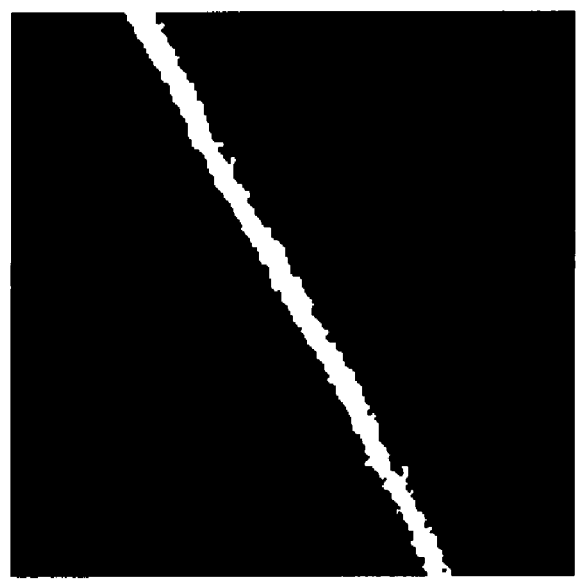
FIG. 14 illustrates the image of the fiber in FIG. 12 after being filtered with a threshold algorithm, a fill function algorithm and a noise removal function algorithm.

Once the fiber analysis software has performed the threshold and fill functions, the image can still be further processed to remove noise. While filling serves to differentiate the fiber from the background, there are still many pixel blocks in the background that are simply noise. A noise removal function searches for white pixels and then maps the size of the pixel block. If the pixel block is larger than a predetermined value, it is assumed to be a fiber. If the pixel block is smaller, it is assumed to be noise and is removed. The function fairly efficiently removes all noise from the image ensuring that the only white pixels left in the image belong to the fiber. FIG. 14 shows an image of the fiber after a noise removal function has been run by the fiber analysis software.

Figure 15:
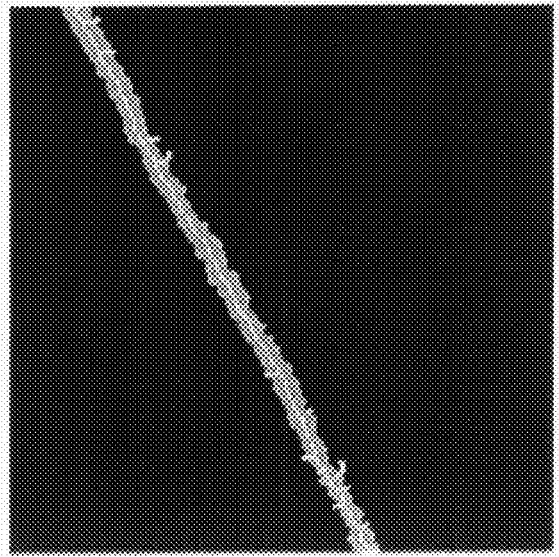
FIG. 15 illustrates the image of the fiber in FIG. 12 after being filtered with a threshold algorithm, a fill function algorithm, a noise removal function algorithm and a thinning function algorithm showing the noise being removed by the thinning function.

Once a fiber has been identified and all noise removed from the background the next step preformed by the fiber analysis software is to thin the fiber so that it is one pixel wide for the entirety of the fiber. The thinning function analyzes the perimeter of the fiber and for each pixel determines if that pixel can be removed from the fiber. If the pixel can be removed, it is deleted and the function moves to the next pixel. If the pixel cannot be removed, the pixel is left in place since removing it would cause a broken skeleton. FIG. 15 shows a post thinning image of a fiber and FIG. 16 shows an image of the fiber after a thinning function has been fully run by the fiber analysis software.

Figure 16:
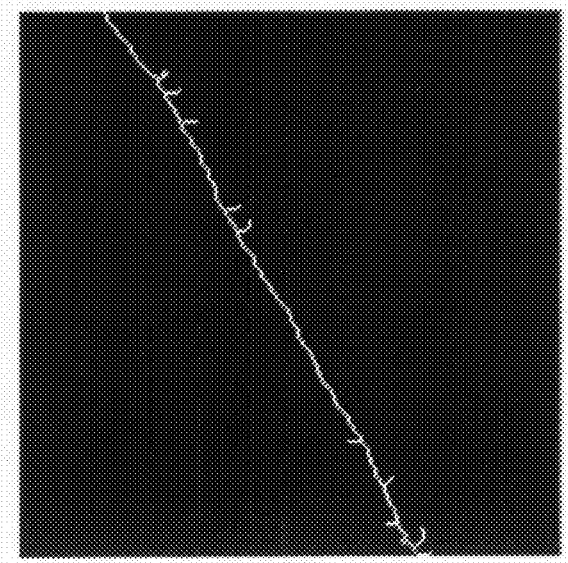
FIG. 16 illustrates the image of the fiber in FIG. 15 after removal of the noise discarded by the thinning function algorithm.
Figure 17:
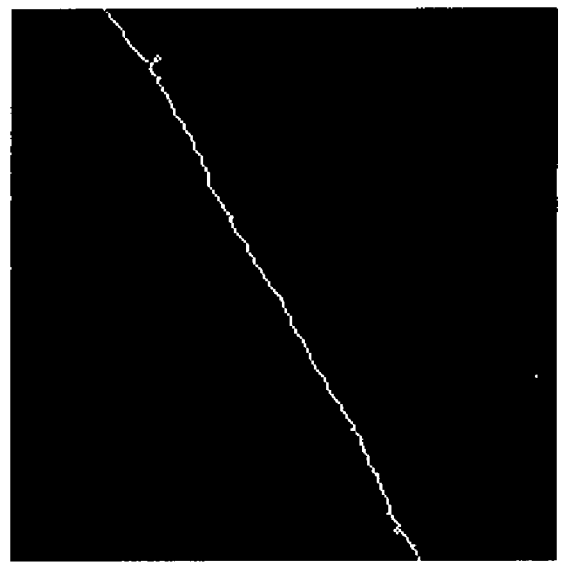
FIG. 17 illustrates the image of the fiber in FIG. 12 after being filtered with a threshold algorithm, a fill function algorithm, a noise removal function algorithm, a thinning function algorithm, and a nub removal algorithm.

As shown in FIG. 16, the thinning function algorithm tends to leave "nubs" or small hairs protruding from the edges of the fiber as it outlines the fibers. A nub removing function algorithm can be run by the fiber analysis software, which can remove the "nubs" quite effectively. FIG. 17 shows an image of the fiber after a nub removing function has been run by the fiber analysis software.

Figure 18:
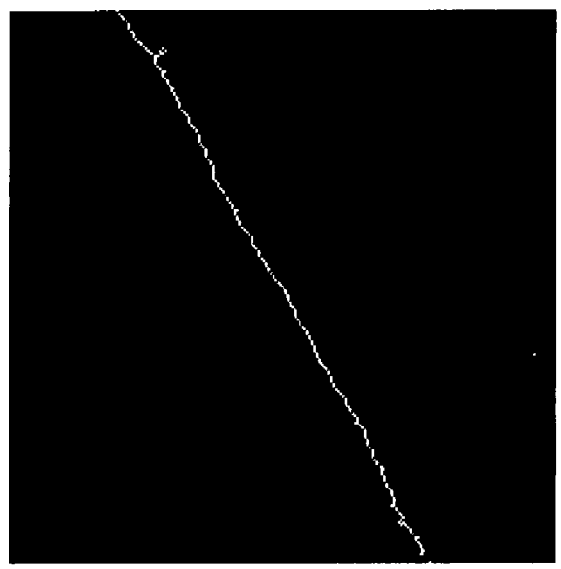
FIG. 18 illustrates the image of the fiber in FIG. 17 as it will be used to determine the length of the fiber.
Figure 19:
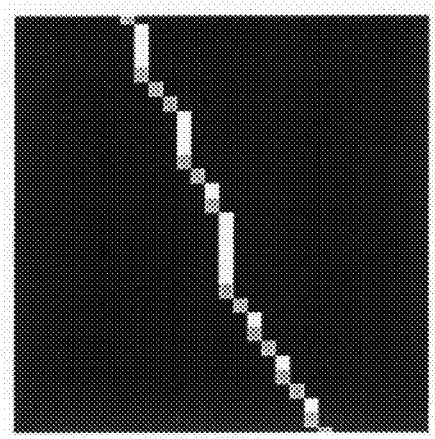
FIG. 19 illustrates a close-up of a portion of the image of the fiber in FIG. 18.

Next, the fiber analysis software can run an algorithm used to determine the length of the fiber. A counting function algorithm can be used to count pixels. While the counting function counts it can differentiate between a horizontal/vertical and a diagonal movement compensating for the 1.41 or 2 times length increase of a diagonal movement over a horizontal/vertical movement. FIG. 18 shows the fiber after the length was determined in a wide view and FIG. 19 shows the fiber after the length was determined in a close up view. The close up view illustrates how the software differentiates between a diagonal movement and a vertical movement, the diagonal being colored grey while the vertical movement remains white. Counting the pixels individually can be fast, and introduces a relatively low amount of error into the analysis. Other image analysis methods are conventionally available and can be used in the fiber analysis software. It is intended that these other conventional image analysis methods be included in the present subject matter.

Controller 20 can include a visual interface that allows the user to control the fiber measurement system 10 including camera 50 and the fiber analysis software. The visual interface can permit the input of data to the fiber analysis software. A visual interface is needed to take commands, inputs and call all the functions of the fiber measurement system from a central menu. The design of the database can be an important aspect of the visual interface since it dictates how all the information is linked and recalled. Different possible visual interface and database set-ups can be used as is known in the art. An embodiment of a visual interface and a controller is provided below. The embodiment is provided to explain the subject matter and not as a limitation.

In the following embodiment, VISUAL BASIC.NET and an MS ACCESS database both from Microsoft Corporation of Redmond, Wash., can be used to create the visual interface and the database, respectively. The visual interface enables the user to control the fiber measurement system, camera, and save the data. With the use of an ACCESS database, the new software adds the ability to save many parameters. By using a database instead of text files to save fiber length data along with information about each sample much more information can be saved and recalled easily.

Figure 20:
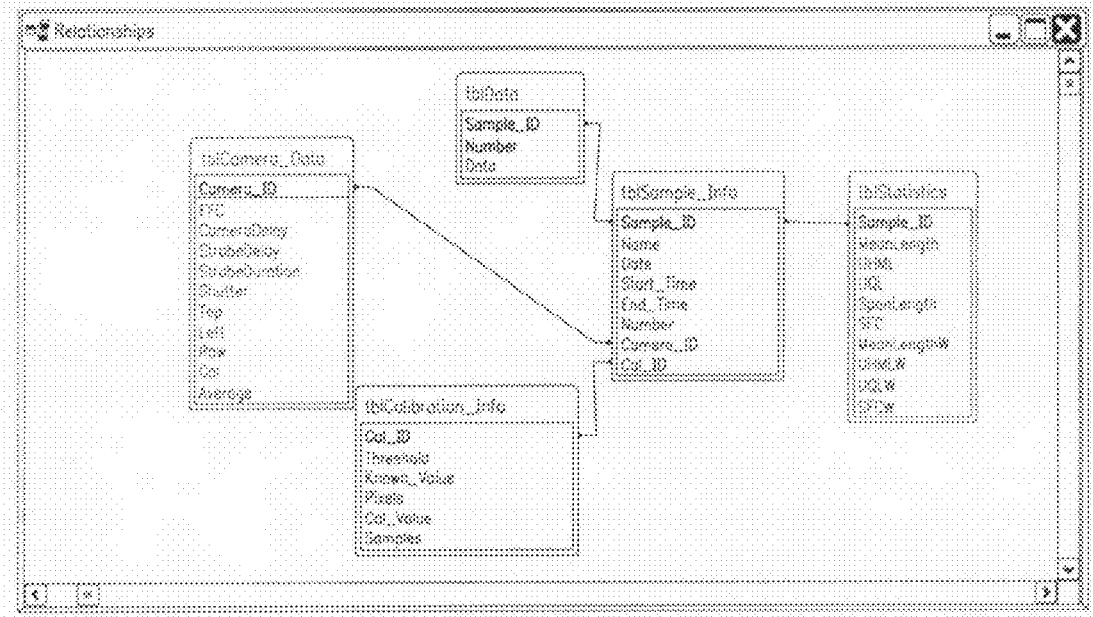
FIG. 20 illustrates a screen shot showing the organization of a database as displayed by a visual interface of a controller used in an embodiment of a fiber measurement system according to the present subject matter.

The design of the database can permit all the data to be saved efficiently. Third normal form can be used to eliminate data redundancies and ensure that all data are linked correctly. FIG. 20 is a screenshot showing the organization of the database with each window representing a separate table and the lines showing the links connecting the all of the data.

The main table is the sample info table (tblSample_Info) which stores the Sample ID, name, date, start time, end time, number of samples, camera ID, and calibration ID. The sample ID is an arbitrary number assigned to each sample to ensure every sample has a unique primary key. The sample ID can be used instead of asking the user for a unique name to allow the same name to be used multiple times. This was a consideration because it is often convenient to label samples as run 1, run 2, etc., instead of having to type a unique while still descriptive name for each sample. The date, start time, and end time can be saved automatically when the sample is run and when the sample ends. The date can be used when searching, to sort the samples and distinguish between samples which may have the same name. The start and end time can be used when comparing the exact time of each run and evaluating different software algorithms in an attempt to optimize time. The number indicates the number of samples acquired during that run, and the calibration ID and camera ID link the sample to the calibration data and camera data used for that run.

The camera data table (tblCamera_Data) can store all of the data required to operate the camera and synchronize the strobe and camera. Most of the parameters will not be changed often. However, for testing, it is helpful to be able to adjust the camera timing and strobe timing to try and optimize the system. All of the data is saved for each run and while most is not crucial the strobe duration, strobe delay, and camera delay are very important in determining image quality at different fiber speeds.

The calibration data table (tblCalibration_info) can store all of the data required to determine the resolution and apply it to a fiber to determine its actual length. The samples, known value, and threshold are all parameters input by the user before the camera is calibrated. The samples are the number of samples taken, the known length is the length of the sample, and the threshold is the value at which the image is thresholded. By averaging the resolution of the samples taken the final resolution in pixels/inch can be determined. The data can be then saved and the resolution is applied to each sample taken after it is calculated. When the program starts up the resolution defaults to the last resolution calculated and will not change until a new one is determined.

Finally, the statistics table (tblStatistics) can store all of the important statistics calculated based on the fiber data. The statistics help describe the sample and enable the user to gather useful information quickly in regards to the quality of the sample. They also allow different runs to be compared to evaluate the accuracy of system changes.

A visual interface can allow users to easily operate the fiber measurement system, save data in the database, search, and recall the data for future analysis. The visual interface performs many functions, the most important of which is the ability to control the functions of the camera. Saving a variety of data describing the specific run along with the data itself in a form that can be easily searched and reviewed is another function that the software can to facilitate. Further, ease of use can be a concern as confusing menus and complicated controls would make it difficult to run the fiber measurement system in a laboratory setting.

Figure 21:
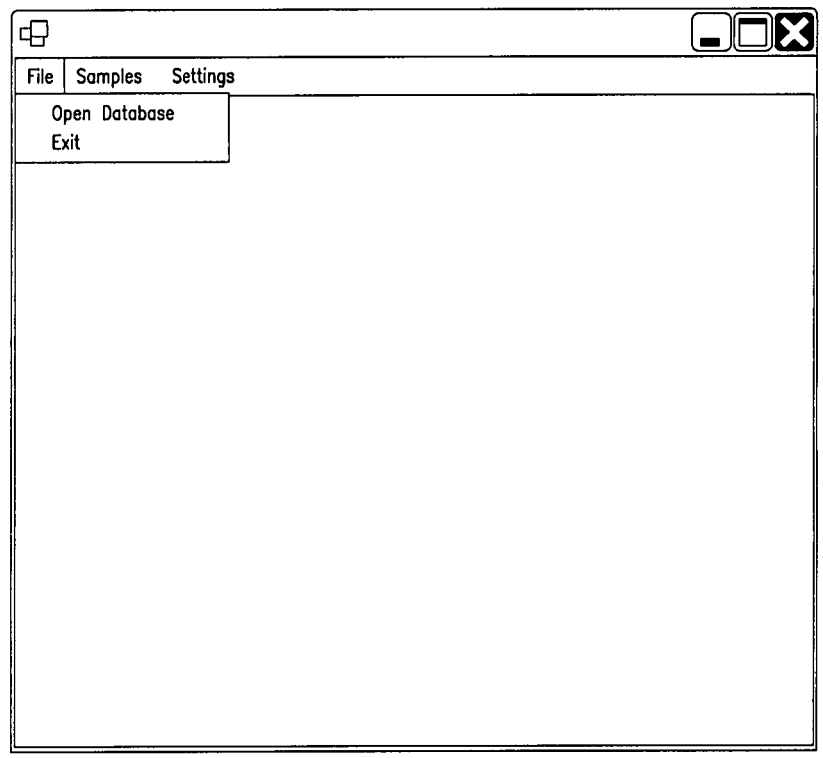
FIG. 21 illustrates a screen shot of a Menu screen displayed by the visual interface according to FIG. 20.

The menu is the first screen that opens when the program is started. The menu can be easy to navigate and the controls can be intuitive so that time is not wasted searching for certain items. A MDI Form can be used for the menu because it allows a familiar menu bar at the top to be used for navigation. MDI Forms can also contain all forms that are open within them so that when the MDI form is closed all windows within it close, saving the user from having to close each form individually. Using a MDI form as a menu also can simplify programming as it is difficult to keep track of different forms when they are not contained within a MDI form. The File tab on the menu bar allows the user to either open the database or exit the program. The last database opened can be automatically opened when the program is run. However, if a new database is to be used or this is the first time the program is run, the user can browse the computer for a suitable database. If no database is loaded the Samples and Settings tabs are disabled and turned grey until a database is selected as shown in FIG. 21.

The samples tab can allow the user to select if they want to Run Sample or View History which then brings up the respective screen within the MDI form and allows the user to perform the desired function. The settings tab allows for the Camera Settings, Camera Resolution, or Calibrate Camera to be selected, leading the user to the desired form.

Figure 22:
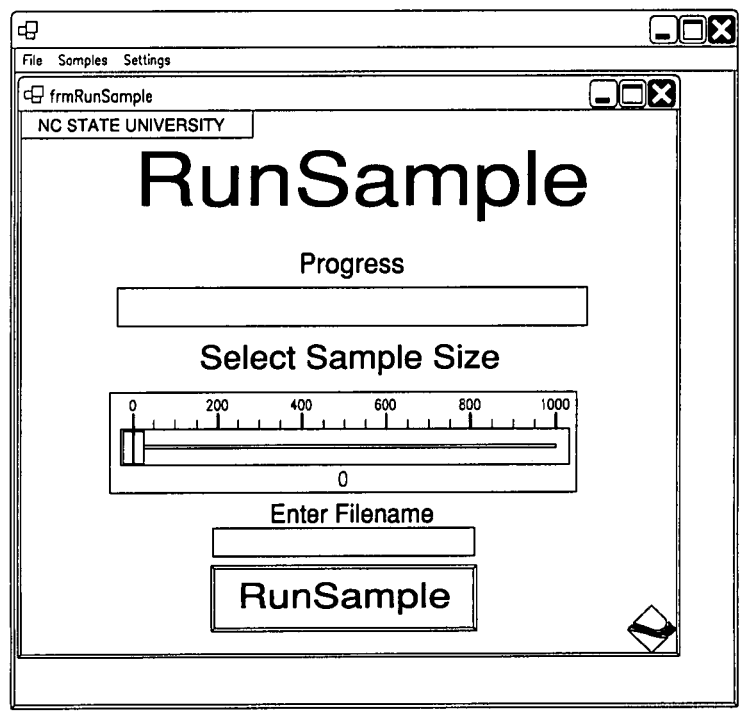
FIG. 22 illustrates a screen shot of a Run Sample screen displayed by the visual interface according to FIG. 20.

FIG. 22 shows a screenshot of a Run Sample screen. The run sample screen allows the user to enter the name of the sample along with selecting the number of fibers to capture in the sample via the sliding bar. The progress bar is meant to display the percentage complete. However, due to the way the visual interface interacts with the Dynamic Linked Library ("DLL"), the progress bar will simply indicate that a sample is being run. When a sample is run, the visual basic program can call the main function of the fiber analysis DLL. By compiling the analysis program as a DLL, certain functions can be accessed using Visual Basic. The function is passed the number of fiber images to collect and the camera settings. The fiber analysis program can then return an array with all of the lengths collected.

Each length can be returned individually. However, continually transferring small amounts of data between the programs can be time consuming and inefficient. Once the sample is finished the run sample form can be closed and the data can be displayed.

Figure 23:
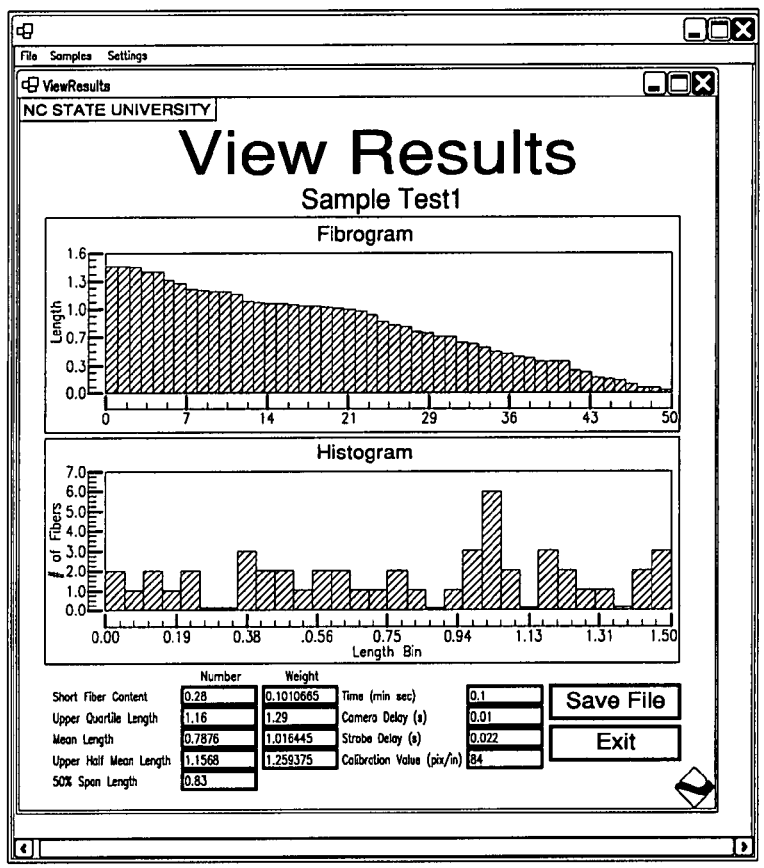
FIG. 23 illustrates a screen shot of a View Results screen displayed by the visual interface according to FIG. 20.

FIG. 23 shows a screenshot of a View Results screen. The view results screen can display the data in a histogram and fibrogram along with displaying all the statistics and information about the camera, calibration, and the time it took for the run. The fibrogram can simply show a graphical display of all of the fibers sorted from tallest to shortest. This allows the user to easily look at the data and assess the quality of the sample. The histogram splits the maximum possible length of a fiber into 0.05 inch bins and displays the number of fibers within each bin.

All of the data can be already saved in the database. To simplify comparison of runs, the user can save the data to a text file. All information displayed along with the actual fiber lengths are saved to a space delimited text file to allow all of the data to be easily placed into MS Excel for further analysis or comparison.

Figure 24:
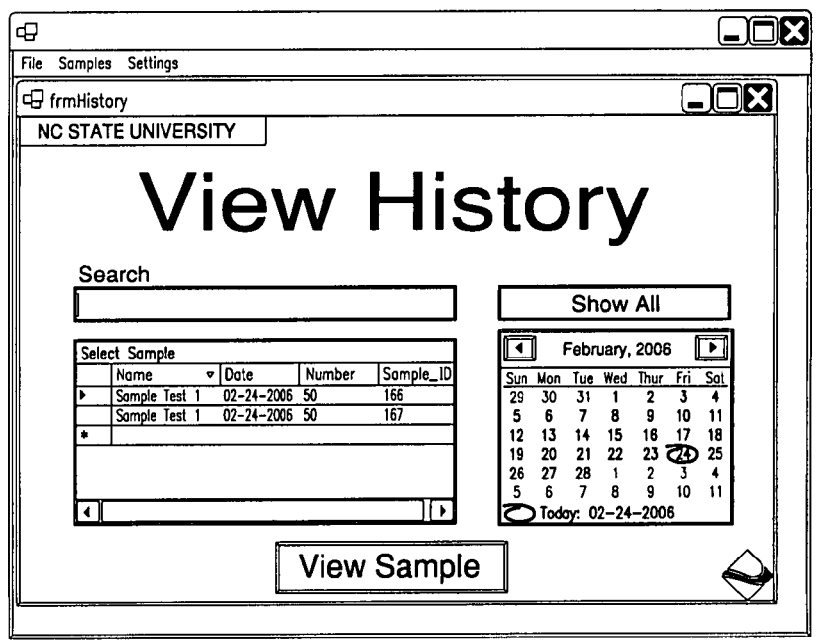
FIG. 24 illustrates a screen shot of a View History screen displayed by the visual interface according to FIG. 20.

FIG. 24 shows a screenshot of a View History screen. The View History screen can provide an interface to easily search the data in a database is useless and recall a specific sample. The View History screen can load and list all of the samples in the select sample window by Name, Date, Number of samples in the run, and Sample ID. By clicking on a date in the calendar the runs made on that date can be listed in the select sample box. All results in the select sample box can be sorted by Name, Date, Number, or Sample ID simply by clicking on the column heading to toggle an ascending or descending sort. The search box can allow all of the records to be searched very effectively. Each time a letter or number is entered into the box the select sample box updates with the matching samples. The user can search based on sample, name, and date and the user can sort by Name, Date, Number or Sample ID. To create the Select Sample view a dataset can be used and linked to the proper tables in the selected database. By manipulating SQL queries based on the user's input, the desired data can quickly and easily be selected and added to the dataset.

Figure 25:
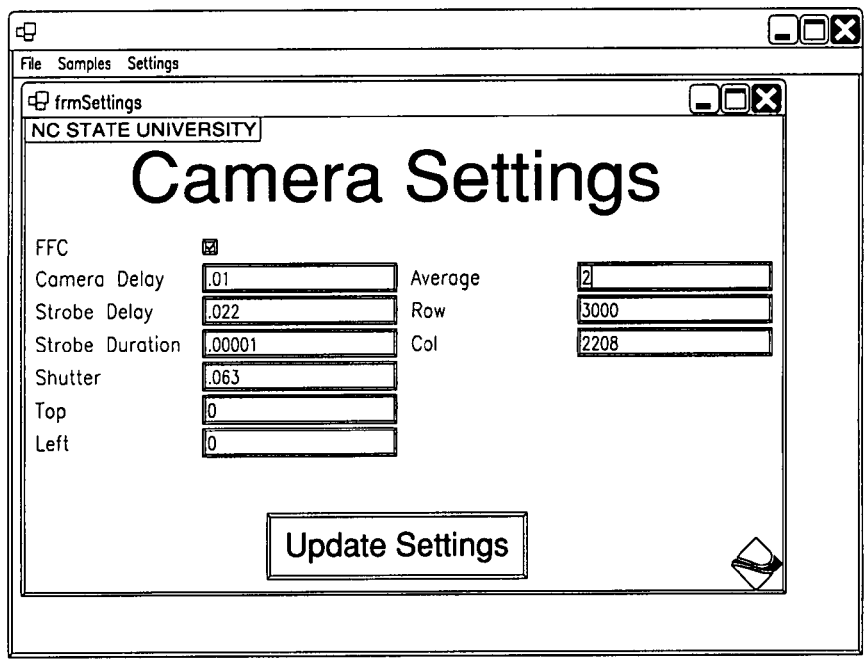
FIG. 25 illustrates a screen shot of a Camera Settings screen displayed by the visual interface according to FIG. 20.

FIG. 25 shows a screenshot of a Camera Settings screen. When the program loads, the camera settings from the previous run can be loaded into a structure to allow the camera settings to be easily accessed by many forms. When the camera settings form is opened, the fields can be populated with the current settings. The user can then modify the settings and choose to update them.

Each time the camera settings are updated, the new group of settings can be given an ID number to differentiate them from previous settings. When a sample is collected, the current ID setting can be saved along with the other data indicating which settings were used for the run. SQL queries can allow all of the data corresponding to each run to be recalled so that the text boxes can be populated with the current settings each time the form is opened.

Figure 26:
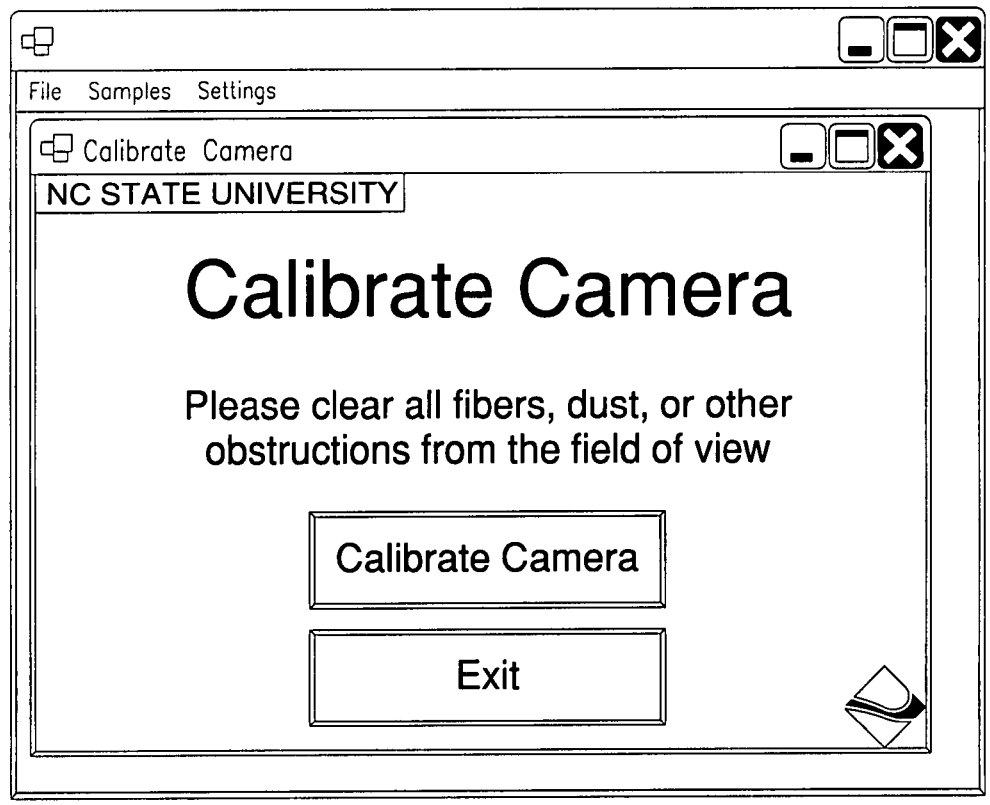
FIG. 26 illustrates a screen shot of a Calibrate Camera screen displayed by the visual interface according to FIG. 20.

FIG. 26 shows a screenshot of a Calibrate Camera screen. To calibrate the camera, the user using the visual interface of the controller can simply call a function in the DLL which then creates a mask to help eliminate variation in the background. As described above, the mask can be created by taking 50 images with no fiber or any other object in the image. For each image taken, the average pixel value can be calculated, and then the difference between each pixel value and the average value can be determined. For each pixel, the difference from the average over the 50 images can be averaged to yield an average difference for each pixel. If there are any small scratches on the top or bottom plate, slight intensity variations from top to bottom, or other factors causing consistent variation throughout the image the mask will fix the error. The mask is then subtracted from each image as the data is taken to cover the known areas of error.

Figure 27:
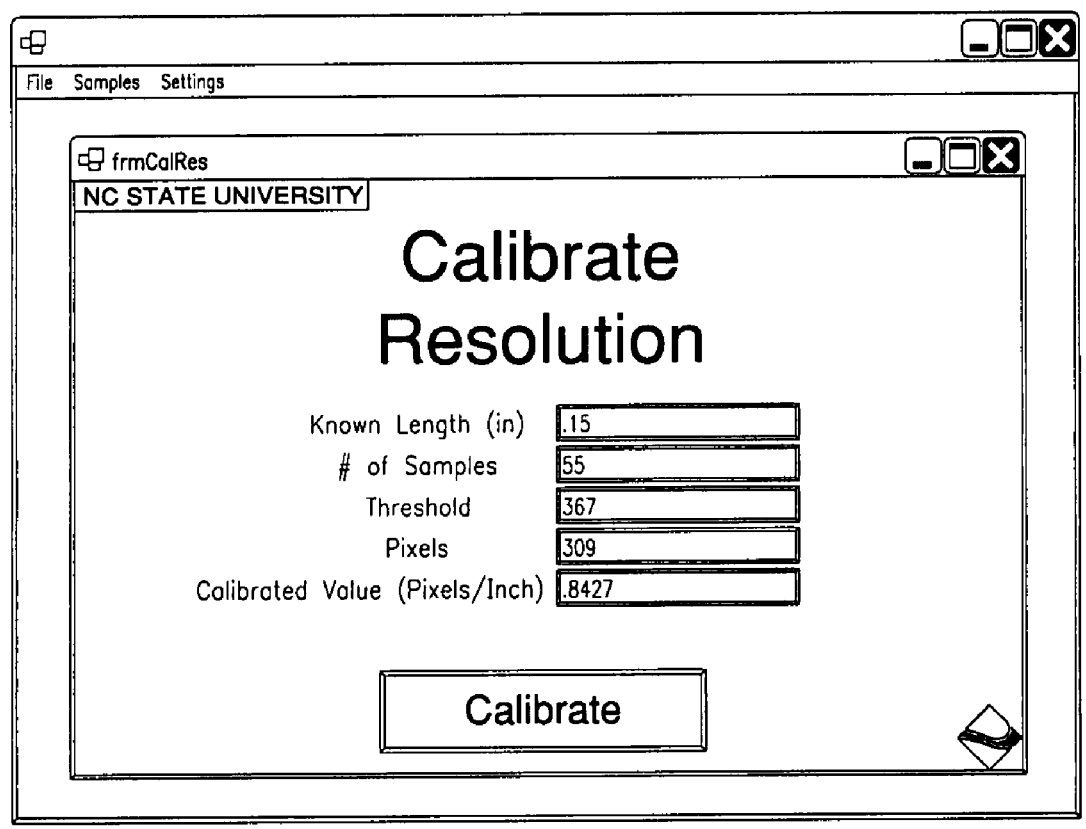
FIG. 27 illustrates a screen shot of a Calibrate Resolution screen displayed by the visual interface according to FIG. 20.

FIG. 27 shows a screenshot of a Calibrate Resolution screen. The Calibrate Resolution is similar in function to the camera settings form in that each time the program is run the Calibrate Resolution structure is automatically populated. This ensures that unless the distance between the camera and the viewing has change, the camera will not have to be recalibrated. To calibrate the camera, an object of known length can be placed in the viewing area and a user-defined number of images can be taken. The images are analyzed just as if the images were of a fiber and the length of the object determined. Based on the average number of pixels calculated and the known length of the object, the resolution can be determined. The new values ca be saved in the database with a unique calibration ID and also saved in the structure for future reference within the program.

The controller is an integral part of the fiber measurement system and like the other primary components must work consistently to ensure that the fiber measurement system is effective.

The above described fiber measurement system solved many problems by allowing individual cotton fibers to be delivered to a viewing area with no physical contact with at least the side walls of the viewing area resulting in an image of the unobstructed fiber being captured by an imaging system.

Embodiments of the present disclosure shown in the drawings and described above are exemplary of numerous embodiments that can be made within the scope of the appending claims. It is contemplated that the configurations described herein can comprise numerous configurations other than those specifically disclosed. The scope of a patent issuing from this disclosure will be defined by these appending claims.

What is claimed is:

1. A fiber measurement system for measuring individual cotton fiber properties including precision measurement of fiber length and fiber length distribution comprising:
    a fiber introduction system configured to introduce a plurality of individualized cotton fibers;
    a fiber guidance enclosure for receiving the fibers from the fiber introduction system, the fiber guidance enclosure having an enclosed pathway and including an enclosed viewing area, the viewing area having a height between about 0.001 inches and about 0.25 inches that limits mobility of the individualized fibers in a Z-direction and the viewing area having a width that is wider than the enclosed pathway;
    a sensing system for detecting the presence of the fibers within the fiber guidance enclosure;
    an imaging system positioned proximal the viewing area of the fiber guidance enclosure to capture an image of each fiber as the fibers pass through the viewing area; and
    a controller for analyzing the image data to determine at least one property of the fibers.

2. The fiber measurement system according to claim 1, wherein the fiber introduction system comprises an opening device.

3. The fiber measurement system according to claim 1, wherein the viewing area comprises sidewalls and wherein the enclosed pathway opens into the viewing area along an axis with the sidewalls of the viewing area being about equidistance from the axis so that fibers leaving the enclosed pathway enter into a middle of the viewing area.

4. The fiber measurement system according to claim 3, wherein the viewing area has a width ranging between about 2 to about 16 times the width of the enclosed pathway.

5. The fiber measurement system according to claim 1, wherein the sensing system comprises a fiber illumination source and a light sensitive sensor that is positioned proximal to the fiber illumination source to detect light from the fiber illumination source reflected off of the passing fibers.

6. The fiber measurement system according to claim 5, wherein the imaging system comprises an imaging light source positioned about perpendicular to the width of the viewing area on one side of the view area and a camera positioned about perpendicular to the width of the viewing area on an opposite side of the view area.

7. The fiber measurement system according to claim 6, wherein the sensor is configured to trigger the camera to capture the image as each individualized fiber passes through the viewing area.

8. The fiber measurement system according to claim 7, wherein the enclosed pathway has a pathway length that is longer than the viewing area length of the viewing area.

9. The fiber measurement system according to claim 6, wherein the camera is configured to trigger the imaging light source simultaneous with the camera capturing the image as each individualized fiber passes through the viewing area.

10. The fiber measurement system according to claim 7, wherein the imaging light source comprises a xenon strobe.

11. The fiber measurement system according to claim 6, wherein the imaging light source comprises a continuous light source that illuminates at least a portion of the viewing area and the camera includes a high speed shutter.

12. The fiber measurement system according to claim 1, wherein the controller comprises a fiber analysis software configured to analyze each image captured by the camera.

13. The fiber measurement system according to claim 12, wherein the fiber analysis software includes at least one of a threshold algorithm, a fill function algorithm, a noise removal function algorithm, a thinning function algorithm, a Fast Fourier Transform algorithm, a nub removal algorithm or a pixel counting algorithm to determine fiber properties.

14. A fiber measurement system for cotton fibers for precision measurement of fiber length and fiber length distribution comprising:
    an opening device configured to introduce a plurality of individualized cotton fibers;
    a fiber guidance enclosure for receiving the fibers from the fiber introduction system, the fiber guidance enclosure having an enclosed pathway and a viewing area, the viewing area having a height between about 0.001 inches and about 0.25 inches that limits mobility of the fibers in a Z-direction and the viewing area having a width that is wider than the enclosed pathway;
    a fiber illumination source positioned to focus light into the enclosed pathway transverse to the path of travel of the fibers;
    a sensor positioned proximal and transverse to the light, the sensor configured to detect reflected light from the light of the fiber illumination source that is reflected off of fibers passing through the enclosed pathway;
    a camera positioned above the viewing area of the fiber guidance enclosure to capture an image of the fibers as the fibers pass through the viewing area;
    an imaging light source positioned below the viewing area of the fiber guidance enclosure configured to backlight the individualized fiber as the fibers pass through the viewing area in synchronization with the camera capturing the image;
    a controller having fiber analysis software for analyzing the image data to determine the length of the fibers.

15. The fiber measurement system according to claim 14, wherein the viewing area comprises sidewalls and wherein the enclosed pathway opens into the viewing area along an axis with the sidewalls of the viewing area being about equidistance from the axis so that fibers leaving the enclosed pathway enter into a middle of the viewing area.

16. The fiber measurement system according to claim 15, wherein the viewing area has a width ranging between about 2 to about 16 times the width of the enclosed pathway.

17. The fiber measurement system according to claim 14, wherein the fiber illumination source is positioned to focus light into the enclosed pathway about perpendicular to the path of travel of the individualized fibers, and the sensor is positioned about perpendicular to the light.

18. The fiber measurement system according to claim 14, wherein the fiber analysis software includes at least one of a threshold algorithm, a fill function algorithm, a noise removal function algorithm, a thinning function algorithm, a nub removal algorithm, or a pixel counting algorithm to determine fiber lengths.

19. The fiber measurement system according to claim 14, wherein the camera and the imaging light source are synchronized to facilitate the capture of images of fibers passing through the viewing area.

20. A method for measuring cotton fiber length and cotton fiber length distribution, the method comprising:
- transporting a plurality of cotton fibers through an enclosed pathway and into a viewing area of a fiber guidance enclosure, the viewing area having a height of between about 0.001 inches and about 0.25 inches that limits mobility of the individualized fibers in a Z-direction and the viewing area having a width that is wider than the enclosed pathway;
- detecting the presence of the fibers within the fiber enclosure;
- signaling an image capturing device positioned above the viewing area when each fiber is approaching the viewing area;
- backlighting the fibers passing through the viewing area;
- generating image data of the fibers with the image capturing device as the fibers are backlit; and
- analyzing the image data with a controller to determine at least one property of the fibers.

21. The method according to claim 20, wherein the step of analyzing the image data comprises filtering the image data with at least one of a threshold algorithm, a Fast Fourier Transform algorithm, a fill function algorithm, a noise removal function algorithm, a thinning function algorithm, a nub removal algorithm or a pixel counting algorithm to determine fiber properties.

* * * * *